(12) United States Patent
Miyazawa

(10) Patent No.: US 8,037,308 B2
(45) Date of Patent: Oct. 11, 2011

(54) ELECTRONIC CERTIFICATE ISSUANCE SYSTEM, ELECTRONIC CERTIFICATE ISSUING DEVICE, COMMUNICATION DEVICE, AND PROGRAM THEREFOR

(75) Inventor: Masafumi Miyazawa, Aichi (JP)

(73) Assignee: Brother Kogyo Kabushiki Kaisha, Aichi (JP)

( * ) Notice: Subject to any disclaimer, the term of this patent is extended or adjusted under 35 U.S.C. 154(b) by 1126 days.

(21) Appl. No.: 11/727,911

(22) Filed: Mar. 29, 2007

(65) Prior Publication Data

US 2007/0234043 A1    Oct. 4, 2007

(30) Foreign Application Priority Data

Mar. 31, 2006  (JP) .................. 2006-098057

(51) Int. Cl.
*H04L 9/32* (2006.01)
(52) U.S. Cl. .......................... 713/175; 726/9
(58) Field of Classification Search .............. None
See application file for complete search history.

(56) References Cited

U.S. PATENT DOCUMENTS

| | | | |
|---|---|---|---|
| 6,672,505 B1 * | 1/2004 | Steinmetz et al. | 235/379 |
| 7,114,070 B1 * | 9/2006 | Willming et al. | 713/156 |
| 7,302,487 B2 * | 11/2007 | Ylonen et al. | 709/229 |
| 7,426,401 B2 * | 9/2008 | Nago | 455/557 |
| 2004/0255113 A1 | 12/2004 | Ogura | |
| 2005/0102522 A1 * | 5/2005 | Kanda | 713/176 |
| 2005/0160259 A1 | 7/2005 | Ogura et al. | |
| 2005/0188193 A1 | 8/2005 | Kuchnel et al. | |
| 2005/0229004 A1 | 10/2005 | Callaghan | |
| 2006/0013399 A1 | 1/2006 | Brickell et al. | |

FOREIGN PATENT DOCUMENTS

| | | |
|---|---|---|
| JP | 63-237633 A | 10/1988 |
| JP | 9-269877 A | 10/1997 |
| JP | 2004-320715 | 11/2004 |
| JP | 2005-346630 | 12/2005 |

OTHER PUBLICATIONS

European Search Report issued in European Patent Application No. EP 07 251 313.8, dated Sep. 25, 2007.
Japanese Official Action dated Nov. 5, 2009 with English translation.

* cited by examiner

*Primary Examiner* — Jung Kim
*Assistant Examiner* — Nadia Khoshnoodi
(74) *Attorney, Agent, or Firm* — Scully, Scott, Murphy & Presser, P.C.

(57) ABSTRACT

An electronic certificate issuance system comprising at least one communication device, and an electronic certificate issuing device for issuing a set of an electronic certificate and a private key corresponding to the electronic certificate as a certification set for each of the at least one communication device, is provided. The electronic certificate issuing device includes a first connecting interface, an obtaining system, which is adapted to obtain a node ID assigned to each of the at least one communication device, a generating system, and a writing system. The at least one communication device includes a second connecting interface, a judging system, and an installing system.

19 Claims, 14 Drawing Sheets

US 8,037,308 B2

ELECTRONIC CERTIFICATE ISSUANCE SYSTEM, ELECTRONIC CERTIFICATE ISSUING DEVICE, COMMUNICATION DEVICE, AND PROGRAM THEREFOR

CROSS REFERENCE TO RELATED APPLICATIONS

This application claims priority from Japanese Patent Application No. 2006-098057, filed on Mar. 31, 2006, the entire subject matter of which is incorporated herein by reference.

BACKGROUND

1. Technical Field

Aspects of the present invention relate to an electronic certificate issuance system having a plurality of communication devices and an electronic certificate issuing device which issues an electronic certificate to each of the communication devices.

1. Related Art

An SSL (Secure Socket Layer) communication is known as a method for achieving a high security communication between a plurality of communication devices. The SSL communication requires a private key and a public key as a key pair to be generated and a CA (Certificate Authority) to issue an electronic certificate corresponding to the public key to certify authenticity of the public key before starting communication. The private key and the electronic certificate for the public key are installed in a server device to be used for the SSL communication.

When a client device sends an initial signal for SSL handshaking to the server device to which the electronic certificate and the private key have been installed, the server device sends the electronic certificate to the client device.

When the electronic certificate from the server device is received by the client device, the client device refers to a digital signature included in the electronic certificate to determine as to whether the electronic certificate is valid without any falsification. If the electronic certificate is determined to be valid, the client device trusts the server device and continues to perform the succeeding procedure. Specifically, the above-mentioned pair of the private key and the public key is used to negotiate a session key (a common key) between the server device and the client device. Once the session key is established, the session key is used for the succeeding cryptographic communication.

For a method of installing a electronic certificate in a server device, it is known that the server device generates a private key and a public key, a CA (Certificate Authority) issues an electronic certificate for the public key, and the issued electronic certificate is installed in the server device. It is also known that a management device working as a CA issues a private key and an electronic certificate for the public key corresponding to the private key, and then the electronic certificate and the private key are installed in the server device.

An example of a method to install the electronic certificate in the server device is disclosed in Japanese Patent Provisional Publication No. 2005-346630. In the publication, an electronic certificate issued by a management device is stored in a portable external storage device such as a USB (Universal Serial Bus) memory, and the external storage device is connected to the server device, thereby installing the electronic certificate in the server device via an external storage device.

SUMMARY

The present invention is advantageous in that there is provided a technology which enables an electronic certificate to be easily installed in each of a plurality of communication devices.

BRIEF DESCRIPTION OF THE ACCOMPANYING DRAWINGS

DETAILED DESCRIPTION

General Overview

Figure 1:
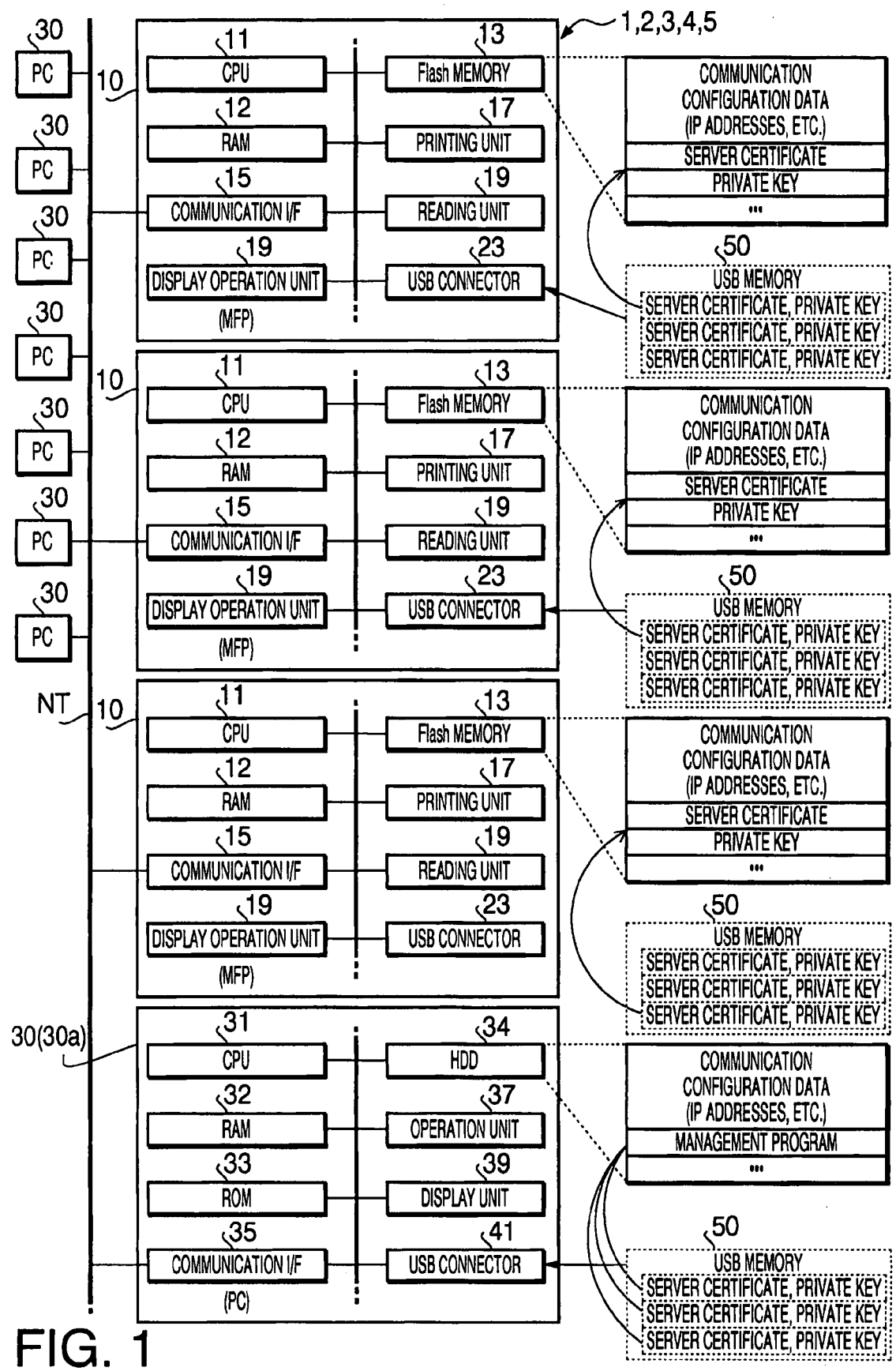
FIG. 1 illustrates a configuration of a communication system 1 in accordance with a first embodiment of the present invention.

According to an aspect of the invention, there is provided an electronic certificate issuance system comprising at least one communication device, and an electronic certificate issuing device for issuing a set of an electronic certificate and a private key corresponding to the electronic certificate as a certification set for each of the at least one communication device. The electronic certificate issuing device includes a first connecting interface, through which an external storage device can be removably connected to the electronic certificate issuing device, an obtaining system, which is adapted to obtain a node ID assigned to each of the at least one communication device by requesting the at least one communication device for the node ID, a generating system, which is adapted to generate the electronic certificate to include the node ID obtained by the obtaining system as owner ID information of the electronic certificate and the private key corresponding to the electronic certificate for each of the at least one communication device, and a writing system, which is adapted to write the certification set including the electronic certificate and the private key corresponding to the electronic certificate generated for the at least one communication device into the external storage device connected to the first connecting interface. The at least one communication device includes a second connecting interface, through which the external storage device can be removably connected to the communication device, a judging system, which is adapted to judge as to whether the electronic certificate, of which node ID as the owner ID information included in the electronic certificate is identical to the node ID assigned to the communication device itself, and the private key corresponding to the electronic certificate are written in the external storage device when the external storage device is connected to the communication device through the second connecting interface, and an installing system, which is adapted to install the electronic certificate having the node ID as the owner ID information identical to the node ID assigned to the communication device itself and the private key corresponding to the electronic certificate into the communication device itself from the external storage device when it is determined that the electronic certificate, of which node ID as the owner ID information is identical to the node ID assigned to the communication device itself, and the private key corresponding to the electronic certificate are written in the external storage device.

Optionally, a plurality of the at least one communication device may be provided. The writing system collectively may write a plurality of certification sets, each of which includes the electronic certificate and the private key corresponding to the electronic certificate generated for each of the plurality of communication devices, into the external storage device connected to the first connecting interface in a batch when a plurality of certificate sets are issued for the plurality of communication devices by the electronic certificate issuing device.

Optionally, the plurality of the at least one communication device and the electronic certificate issuing device may be communicably connected to each other through a network. The obtaining system may obtain the node ID assigned to each of the plurality of communication devices by broadcasting a request for the node ID to the each of the plurality of communication devices.

According to the above configuration, the electronic certificate issuing device has a function to install a plurality of certification sets each of which including an electronic certificate and a private key issued to each of the communication devices collectively into the external storage device. Each communication device can be configured to have an automatic selection function to detect and install a set of the electronic certificate and the private key corresponding to the electronic certificate issued for the communication device itself among a plurality of certification sets having the electronic certificate and the private key stored in the external storage device.

Therefore, the electronic certificate issuance system according to the present invention provides a simple method for a user to install an appropriate set of the electronic certificate and the private key to each corresponding communication device simply by inserting and removing a single external storage device into and from each of the communication devices. Thus, the present invention allows the user to easily install an appropriate electronic certificate to each corresponding communication device and prevents a wrong electronic certificate to be installed into an incorrect communication device due to conventional human errors.

It should be noted that the term "node ID" in the present invention is referred to as information used to identify a node in a network. For example, an IP address is used as the node ID for an IP (Internet Protocol) network. Further, FQDN (Fully Qualified Domain Name) and MAC (Media Access Control) address can also be used as the node ID.

In order to maintain a correspondence between the electronic certificate and the private key stored in the external storage device, each set of the electronic certificate and the private key may be stored in a different directory, or some relevant file names may be assigned to a file for the electronic certificate and the private key.

The determination that the external storage device contains an electronic certificate, in which the node ID assigned to the communication device itself is written as the owner ID information of the electronic certificate, and a private key corresponding to the electronic certificate, may be made by referring to the owner ID information written in each of the electronic certificates stored in the external storage device, or by referring to information such as an electronic label capable of identifying a node ID.

For example, such information capable of identifying a node ID may be included in the name of a file in which the electronic certificate and the private key are stored, or in the name of a directory having a file in which the electronic certificate and the private key are stored. Then, the information can be referred to for making the above-mentioned determination.

Optionally, the electronic certificate issuing device may include a labeling system, which is adapted to assign an electronic label identifying the node ID included in the electronic certificate as the owner ID information of the electronic certificate to each of the plurality of certification sets having the electronic certificate and the private key corresponding to the electronic certificate generated by the generating system. The judging system may judge as to whether the electronic certificate, of which node ID as the owner ID information is identical to the node ID assigned to the communication device itself, and the private key corresponding to the electronic certificate are written in the external storage device based on the electronic label assigned by the labeling system to the electronic certificate.

The electronic certificate issuance system configured as above makes the above-mentioned determination without referring to the owner ID information of the electronic certificate, thereby reduces a processing load required to determine that the external storage device contains the electronic certificate in which the node ID assigned to the communication device itself is written as the owner ID information, and the private key corresponding to the electronic certificate.

For another method of maintaining the correspondence between the electronic certificate and the private key in the external storage device, the set of the electronic certificate and the private key can be combined into a file for each pair.

Optionally, the electronic certificate issuing device may include a file creating system to create a plurality of data files, each of which contains a set of data representing the electronic certificate with the node ID as the owner ID information of the electronic certificate and the private key corresponding to the electronic certificate. The writing system may be adapted to collectively write the plurality of data files in a batch into the external storage device connected to electronic certificate issuing device through the first connecting interface.

In the above-mentioned electronic certificate issuance system, a set of the electronic certificate and the private key can be combined into a single file for the certification set basis and the files can be collectively stored in the external storage device, thereby providing a simple structure for maintaining the correspondence between the electronic certificate and the private key in the external storage device.

In the electronic certificate issuance system, the file creating system may be configured to create a data file containing a set of data which consists of the electronic certificate and the private key corresponding to the electronic certificate issued by the generating system, and then name the data file with the node ID indicated by the owner ID information of the electronic certificate.

Optionally, the electronic certificate issuing device may include a file creating system to create a plurality of data files, each of which has a file name and contains a set of data representing the electronic certificate and the private key corresponding to the electronic certificate issued by the electronic certificate issuing device. The file name of the data file may be represented by the node ID as the owner ID information of the electronic certificate. The writing system may be adapted to collectively write the plurality of data files in a batch into the external storage device connected to the electronic certificate issuing device through the first connecting interface. The judging system of each of the communication devices may determine the electronic certificate, of which node ID as the owner ID information is identical to the node ID assigned to the communication device itself, and the private key corresponding to the electronic certificate are written in the external storage device when the data file created by the file creating system, of which file name represented by the node ID as the owner ID information is identical to the node ID assigned to the communication device itself, is stored in the external storage device. The installing system of each of the communication devices may install the electronic certificate and the private key corresponding to the electronic certificate in the set of data contained in the data file into the communication device itself when the judging system determines the electronic certificate, of which node ID as the owner ID information is identical to the node ID assigned to the communication device itself, and the private key corresponding to the electronic certificate are written in the external storage device.

According to the above configuration, the electronic certificate issuance system can detect a data file having the electronic certificate and the private key issued to the communication device itself from the external storage device with a less processing load and at higher speeds.

Optionally, the file creating system may be adapted to encrypt each of the plurality of data files.

According to the above configuration, the electronic certificate issuance system can be configured such that a file creating system encrypts a data file when the data file is created. Once the data file is encrypted, any devices which cannot decrypt the data file cannot use the private key. Also, electronic certificates and private keys stored in the data file cannot be installed to the device.

When an external storage device is passed to a user of the communication device, and the user installs the electronic certificate and the private key, the content of the private key may be exposed to malicious users who may exploit the private key, although that is not the case with the present invention. Accordingly, exploitation of the security vulnerability which may occur when an external storage device is shared by a plurality of users can be prevented. In other words, the electronic certificate issuing device may be configured such that only a user or a communication device capable of decrypting a data file may be allowed to install the electronic certificate and the private key corresponding to the electronic certificate.

Further, obtaining a key required for encryption from each communication device may strengthen to prevent malicious users from exploiting private keys stored in an external storage device.

Optionally, each of the plurality of communication devices may be adapted to generate an encryption key to encrypt the data file created by the file creating system. Each of the plurality of communication devices may be provided with an ID information transmitting system, which transmits the node ID assigned to the communication device itself and the generated encryption key to the electronic certificate issuing device through a network. The electronic certificate issuing device may be communicably connected with the plurality of communication devices through the network. The obtaining system of the electronic certificate issuing device may obtain the node ID assigned to each of the plurality of communication devices and the encryption key through the network from each of the plurality of communication devices for which the electronic certificate is issued. The file creating system may encrypt each of the plurality of data files by using the encryption key obtained by the obtaining system from the communication device having the node ID which is identical to the node ID as the owner ID information of the electronic certificate to be contained in the encrypted data file.

According to the above-configured electronic certificate issuance system, a data file is encrypted with the encryption key transmitted from each corresponding communication device, thereby further strengthening to prevent malicious users from exploiting private keys stored in an external storage device.

The above describes the electronic certificate issuance system which can install the electronic certificate and the private key corresponding to the node ID which has been assigned to the communication device. Therefore, the electronic certificate issuance system can not only install the electronic certificate and the private key, but also assign the node ID to the communication device.

According to an aspect of the invention, there is provided an electronic certificate issuance system comprising at least one communication device and an electronic certificate issuing device for issuing a set of an electronic certificate and a private key corresponding to the electronic certificate as a certification set for each of the at least one communication device. The electronic certificate issuing device includes a first connecting interface, through which an external storage device can be removably connected to the electronic certificate issuing device, an obtaining system, which is adapted to obtain node ID information indicating a node ID to be assigned to the at least one communication device, a generating system, which is adapted to generate the certification set to include configuration data, which contains an instruction for the at least one communication device to set a node ID of the communication device itself as indicated in the node ID information, the electronic certificate, which includes a node ID being identical to the node ID indicated in the node ID information as owner ID information of the electronic certificate, and the private key corresponding to the electronic certificate, and a writing system, which is adapted to write the certification set including the configuration data, the electronic certificate, and the private key corresponding to the electronic certificate generated for the at least one communication device, into the external storage device connected to the first connecting interface. The at least one communication device includes a second connecting interface, through which the external storage device can be removably connected to the communication device, a judging system, which is adapted to judge as to whether the certificate set is written in the external storage device when the external storage device is connected to the communication device through the second connecting interface, and a configuration installing system, which is adapted to specify the certificate set written in the external storage device, sets the node ID of the communication device itself to the node ID indicated in the configuration data which is included in the specified certificate set, and install the electronic certificate and the private key corresponding to the electronic certificate included in the specified certificate set into the communication device itself.

Optionally, a plurality of the at least one communication device may be provided. The writing system collectively may write a plurality of certification sets, each of which includes the electronic certificate and the private key corresponding to the electronic certificate generated for each of the plurality of communication devices, into the external storage device connected to the first connecting interface in a batch when a plurality of certificate sets are issued for the plurality of communication devices by the electronic certificate issuing device. The judging system of each of the plurality of communication devices may judge as to whether at least one of the certificate sets is written in the external storage device when the external storage device is connected to the communication device through the second connecting interface. The configuration installing system of each of the plurality of communication devices may arbitrarily select one certificate set among the at least one of the certificate sets written in the external storage device, sets the node ID of the communication device itself to the node ID indicated in the configuration data which is included in the selected certificate set, and install the electronic certificate and the private key corresponding to the electronic certificate included in the selected certificate set into the communication device itself.

In the above-configured electronic certificate issuance system, when the electronic certificate and the private key are issued, the configuration data is issued to indicate that a node ID written as the owner ID information should be set to the electronic certificate. When the electronic certificate and the private key are installed, its corresponding node ID is set to the node ID of the communication device to which the electronic certificate and the private key are to be installed, thereby ensuring the prevention of the wrong electronic certificate to be installed into an incorrect communication device.

According to the above configuration, an appropriate electronic certificate can be easily and securely installed into each of the plurality of communication devices. In addition, during the network configuration, not only installation of the electronic certificates, but also configuring IP addresses for communication can be achieved.

According to an aspect of the invention, there is provided an electronic certificate issuance system comprising at least one communication device, which is communicably connected to a network, and an electronic certificate issuing device, which is communicably connected with the at least one communication device through the network, for issuing an electronic certificate for the at least one communication device. The electronic certificate issuing device includes a first connecting interface, through which an external storage device can be removably connected to the electronic certificate issuing device, an obtaining system, which obtains a node ID assigned to the at least one communication device and a public key corresponding to a private key generated in the at least one communication device by requesting the at least one communication device for the node ID through the network, a generating system, which is adapted to generate an electronic certificate, which includes the node ID obtained from the at least one communication device by the obtaining system as owner ID information of the electronic certificate and certifies authenticity of the public key obtained from the communication device by the obtaining system, a writing system, which is adapted to write the electronic certificate generated by the generating system into the external storage device connected to the first connecting interface. The at least one communication device includes a second connecting interface, through which the external storage device can be removably connected to the communication device, a key generating system, which generates the private key to be used in the communication device itself and the public key corresponding to the private key, an ID information transmitting system, which transmits the public key generated by the key generating system and the node ID assigned to the communication device itself to the electronic certificate issuing device through the network, a judging system, which is adapted to judge as to whether the electronic certificate issued for the communication device itself is written in the external storage device when the external storage device is connected to the communication device through the second connecting interface, and an installing system, which installs the electronic certificate and the private key corresponding to the electronic certificate written in the external storage device into the communication device itself when the judging system determines the electronic certificate issued for the communication device itself is written in the external storage device.

Optionally, a plurality of communication devices may be communicably connected to the network. The writing system collectively may write a plurality of certification sets, each of which includes the electronic certificate and the private key corresponding to the electronic certificate issued for each of the plurality of communication devices, into the external storage device connected to the first connecting interface in a batch when a plurality of certificate sets are issued for the plurality of communication devices by the electronic certificate issuing device.

Optionally, the obtaining system may obtain the node ID assigned to each of the plurality of communication devices by broadcasting a request for the node ID to the each of the plurality of communication devices.

In the above-configured electronic certificate issuance system, the electronic certificate issuing device has a function to acquire a public key from each of the plurality of communication devices, and install a plurality of sets of the electronic certificate corresponding to the public key, collectively into the external storage device. Each communication device has an automatic selection function to detect the electronic certificate issued to the communication device itself from the external storage device and install the electronic certificate to the communication device itself.

Accordingly, the electronic certificate issuance system allows the user to install an appropriate electronic certificate to each communication device simply by inserting and removing a single external storage device into and from the communication device. Thus the user can easily install an appropriate electronic certificate to each of the communication devices.

The obtaining system in the electronic certificate issuing device can be configured to transmit a query signal through the network and then obtains the node ID and a public key as a response signal to the query signal from the communication device.

The judging system may be configured to determine as to whether the electronic certificate issued to the communication device itself is stored in the external storage device, based on the file name assigned to the electronic certificate.

Optionally, the judging system may determine the electronic certificate issued for each of the plurality of communication devices itself is written in the external storage device by referring to the public key, of which authenticity is certified by the electronic certificate written in the external storage device, and determining the electronic certificate certifying the authenticity of the public key generated in the communication device itself is written in the external storage device.

The electronic certificate issuance system detects the electronic certificate issued to the communication device itself by referring to each of the public keys of the electronic certificates stored in the external storage device, and then installs the electronic certificate to the communication device itself. Accordingly, the electronic certificate issuance system can install an appropriate electronic certificate to the communication device itself by identifying the corresponding between the electronic certificate and the private key stored in the communication device itself.

According to an aspect of the invention, there is provided an electronic certificate issuing device to issue an electronic certificate and a private key corresponding to the electronic certificate for a communication device communicably connected to the electronic certificate issuing device, comprising a connecting interface, through which an external storage device can be removably connected to the electronic certificate issuing device, an obtaining system, which is adapted to obtain information regarding a node ID of the communication device for which the electronic certificate is issued by the electronic certificate issuing device, a generating system, which is adapted to generate the electronic certificate to include a node ID indicated in the information regarding the node ID of the communication device obtained by the obtaining system as owner ID information of the electronic certificate and the private key corresponding to the electronic certificate for the communication device, and a writing system, which is adapted to write a certificate set including the electronic certificate and the private key corresponding to the electronic certificate issued for the communication device into the external storage device connected to the first connecting interface.

Optionally, a plurality of the communication devices may be communicably connected to the electronic certificate issuing device. The writing system may collectively write a plurality of the certification set, each of which includes the electronic certificate and the private key corresponding to the electronic certificate issued for each of the plurality of communication devices, into the external storage device connected to the connecting interface in a batch when the plurality of certificate sets are issued for the plurality of communication devices by the electronic certificate issuing device.

With the electronic certificate issuing device as above, the electronic certificate issuance system as described above can be achieved.

Optionally, the electronic certificate issuance device may further comprises a file creating system to create a plurality of data files, each of which has a file name and contains a set of data representing the electronic certificate and the private key corresponding to the electronic certificate issued by the electronic certificate issuing device, for each of the node IDs obtained by the obtaining system. The file name of each of the data files may be represented by the node ID as the owner ID information of the electronic certificate. The writing system may collectively write the plurality of data files, each of which includes the electronic certificate and the private key corresponding to the electronic certificate, in a batch into the external storage device connected to the connecting interface.

Optionally, the information regarding the node ID of the communication device may indicate a node ID to be assigned to the at least one communication device. The obtaining system may obtain the node ID to be assigned to the at least one communication device. The generating system may generate the certification set to include configuration data, which contains an instruction for the at least one communication device to set a node ID of the communication device itself as indicated in the node ID information, the electronic certificate, which includes a node ID being identical to the node ID indicated in the node ID information as owner ID information of the electronic certificate, and the private key corresponding to the electronic certificate. A writing system, which is adapted to write the certification set including the configuration data, the electronic certificate, and the private key corresponding to the electronic certificate generated for the at least one communication device, into the external storage device connected to the first connecting interface, is provided to the electronic certificate issuance device.

With the electronic certificate issuing device as above, the electronic certificate issuance system as described above can be achieved.

Optionally, a plurality of the communication devices may be communicably connected to the electronic certificate issuing device. The writing system may collectively write a plurality of the certification set, each of which includes the electronic certificate and the private key corresponding to the electronic certificate issued for each of the plurality of communication devices, into the external storage device connected to the connecting interface in a batch when the plurality of certificate sets are issued for the plurality of communication devices by the electronic certificate issuing device.

With the electronic certificate issuing device as above, the electronic certificate issuance system as described above can be achieved.

According to an aspect of the invention, there is provided a communication device with a node ID assigned thereto, comprising a connecting interface through which an external storage device containing at least one data set which includes data representing an electronic certificate and a private key corresponding to the electronic certificate can be removably connected to the communication device, a judging system, which is adapted to judge as to whether the electronic certificate, of which node ID as the owner ID information included in the electronic certificate is identical to the node ID assigned to the communication device itself, and the private key corresponding to the electronic certificate are written in the external storage device when the external storage device is connected to the communication device through the connecting interface, and an installing system, which is adapted to install the electronic certificate having the node ID as the owner ID information identical to the node ID assigned to the communication device itself and the private key corresponding to the electronic certificate into the communication device itself from the external storage device when it is determined that the electronic certificate, of which node ID as the owner ID information is identical to the node ID assigned to the communication device itself, and the private key corresponding to the electronic certificate are written in the external storage device.

Optionally, the data set contained in the external storage device may consist of a data file having a file name, the file name being a node ID as the owner ID information of the electronic certificate. The judging system may judge as to whether a data set as a data file which has a file name being identical to the node ID assigned to the communication device is written in the external storage device when the external device is connected to the communication device through the connecting interface. The installing system may install the electronic certificate and the private key corresponding to the electronic certificate written in the external storage device into the communication device itself when the judging system determines the data file having a file name which is identical to the node ID assigned to the communication device itself is written in the external storage device With the communication device as above, the electronic certificate issuance system as described above can be achieved.

With the communication device as above, the electronic certificate issuance system as described above can be achieved.

According to an aspect of the invention, there is provided communication device comprising a connecting interface through which an external storage device can be removably connected, a judging system for judging as to whether a data set including configuration data, which contains a node ID for the communication device and an instruction for the communication device to set the contained node ID to the communication device itself, an electronic certificate, which includes a node ID as owner ID information of the electronic certificate being identical to the node ID indicated in the configuration data, and a private key corresponding to the electronic certificate, is written in the external storage device, and a configuration installing system, which is adapted to specify the data set written in the external storage device, sets the node ID of the communication device itself to the node ID contained in the configuration data which is included in the specified certificate set, and install the electronic certificate and the private key corresponding to the electronic certificate included in the specified certificate set into the communication device itself.

With the communication device as above, the electronic certificate issuance system as described above can be achieved.

According to an aspect of the invention, there is provided a computer usable medium comprising computer readable instructions for controlling a computer, having a connecting interface through which an external storage device is connected to the computer, to issue an electronic certificate and a private key corresponding to the electronic certificate for a communication device, by executing steps of obtaining a node ID of the communication device for which the electronic certificate and the private key corresponding to the electronic certificate are issued, generating the electronic certificate to include the obtained node ID of the communication device as owner ID information of the electronic certificate and the private key corresponding to the electronic certificate, and writing the generated electronic certificate and the private key corresponding to the electronic certificate into the external storage device connected to the computer through the connecting interface.

With the computer usable medium as above, the electronic certificate issuance system as described above can be achieved.

According to an aspect of the invention, there is provided a computer usable medium comprising computer readable instructions for controlling a computer, having a connecting interface through which an external storage device is connected to the computer, to issue an electronic certificate and a private key corresponding to the electronic certificate for a communication device, by executing steps of obtaining node ID information indicating a node ID to be assigned to the communication device for which the electronic certificate and the private key corresponding to the electronic certificate, generating a certification set to include configuration data, which contains an instruction for the communication device to set a node ID of the communication device itself as indicated in the node ID information, the electronic certificate, which includes a node ID being identical to the node ID indicated in the node ID information as owner ID information of the electronic certificate, and the private key corresponding to the electronic certificate, and writing the certification set including the configuration data, the electronic certificate, and the private key corresponding to the electronic certificate generated for the communication device, into the external storage device connected to the communication device through the connecting interface.

With the computer usable medium as above, the electronic certificate issuance system as described above can be achieved.

According to an aspect of the invention, there is provided a computer usable medium comprising computer readable instructions for controlling a computer, having a connecting interface through which an external storage device is connected to the computer itself, to have an electronic certificate and a private key corresponding to the electronic certificate issued for the computer itself, by executing steps of judging as to whether the electronic certificate including a node ID as owner ID information of the electronic certificate being identical to a node ID assigned to the communication device and the private key corresponding to the electronic certificate are written in the external storage device when the external storage device is connected to the computer through the connecting interface, and installing the electronic certificate and the private key corresponding to the electronic certificate written in the external storage device into the communication device itself when the electronic certificate including a node ID as owner ID information of the electronic certificate being identical to the node ID assigned to the communication device and the private key corresponding to the electronic certificate are written in the external storage device.

With the computer usable medium as above, the electronic certificate issuance system as described above can be achieved.

According to an aspect of the invention, there is provided a computer usable medium comprising computer readable instructions for controlling a computer, having a connecting interface through which an external storage device is connected to the computer itself, to have an electronic certificate and a private key corresponding to the electronic certificate issued for the computer itself, by executing steps of judging as to whether a data set including configuration data, which contains a node ID for the communication device and an instruction for the communication device to set the contained node ID to the communication device itself, an electronic certificate, which includes a node ID as owner ID information of the electronic certificate being identical to the node ID indicated in the configuration data, and a private key corresponding to the electronic certificate, is written in the external storage device, specifying the data set written in the external storage device, setting the node ID of the communication device itself to the node ID contained in the configuration data which is included in the specified certificate set, and installing the electronic certificate and the private key corresponding to the electronic certificate included in the specified certificate set into the communication device itself.

With the computer usable medium as above, the electronic certificate issuance system as described above can be achieved.

EMBODIMENTS

Hereinafter, embodiments of the present invention will be described with reference to the accompanying drawings.

First Embodiment

FIG. 1 illustrates a configuration of a communication system 1 in accordance with a first embodiment of the present invention. As shown in FIG. 1, the communication system 1 includes a TCP/IP-based network NT which connects a plurality of digital MFPs (Multifunction Peripherals) 10 and PCs (Personal Computers) 30.

The MFP 10 includes a CPU 11, a RAM 12 used as a work memory, a flash memory 13 for storing various programs and data, a communication interface 15 connected to the network NT, a printing unit 17 for forming images on a recording medium such as paper by an image forming method such as laser printing and ink jet printing, a reading unit 19 for optically reading a document placed on a document platform and generating image data, a display operation unit 21 used as a user interface having various user-operatable keys and a display screen, and a USB connector 23 used as an interface for connecting the MFP 10 to various USB devices. The CPU 11 executes various programs to perform TCP/IP communication, SSL communication, printing, scanning, copying and other functions.

The MFP 10 has communication configuration data indicating configuration information necessary for the TCP/IP communication, such as IP addresses, subnet masks, default gateways, and the like, in the flash memory 13. The MFP 10 communicates with the other devices through the network NT according to this configuration information.

The MFP 10 is provided with a printing function and is capable of receiving printing data from an external PC 30 during the above-described cryptographic communication. When the printing data from the external PC 30 is received through the communication interface 15, the MFP 10 controls the printing unit 17 to form an image on the paper based on the printing data. Further, the MFP 10 is provided with a scanning function, and when a read command is received from the display operation unit 21 in response to a user action to the display operation unit 21, the MFP 10 controls the reading unit 19 to generate image data for an image read from a document placed on the document platform and then sends the data to a predetermined PC 30 through the communication interface 15.

The PC 30 is configured similarly to a well-known personal computer, having a CPU (Central Processing Unit) 31, a RAM (Random Access Memory) 32 used as a work memory, a ROM (Read Only Memory) 33 for storing boot programs, etc., an HDD (Hard Disk Drive) 34, a communication interface 35 connected to the network NT, an operation unit 37 having a keyboard and a pointing device, a display unit 39 having a liquid crystal display and the like, and a USB connector 41 used as an interface for connecting the PC 30 to USB devices.

In each of the PCs 30, the CPU 31 respectively executes various programs to provide TCP/IP, SSL, and other communication functions. According to the present embodiment, one of the PCs 30 constituting the communication system 1 serves as a management PC 30a which executes a management program to issue a server certificate, a public key of which information is included in the server certificate, and a private key corresponding to the public key indicated in the server certificate, to each MFP 10.

The MFP 10 reads the server certificate, which is an electronic certificate issued to the MFP 10 itself, and the private key corresponding to the public key included in the server certificate, from the USB memory 50 used as an external storage unit through the USB connector 23, and installs the server certificate and the private key in the flash memory 13. When an external communication device (i.e., a PC 30 as a client device) accesses the MFP 10 through an SSL communication port (not shown), the MFP 10 executes a handshake process for the SSL communication and sends the server certificate stored in the flash memory 13 to the PC 30 which is accessing.

Figure 2:
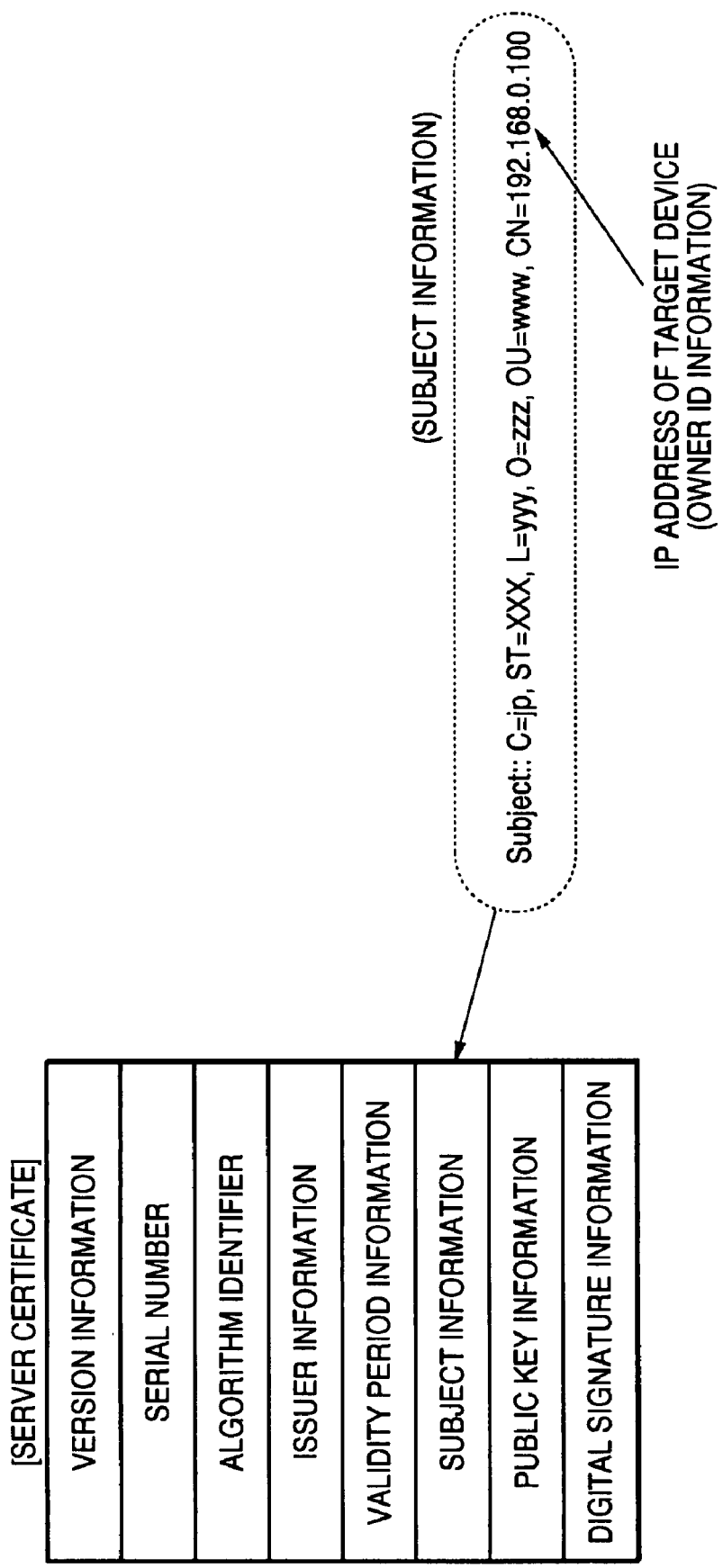
FIG. 2 illustrates a server certificate issued by a management PC 30a in accordance with the first embodiment of the present invention.

Next, the MFP 10 negotiates with the PC 30 to generate a session key for cryptographic communication using the public key included in the server certificate and the private key stored in the MFP 10. Then the MFP 10 uses the session key to perform the cryptographic communication between this MFP 10 and the PC 30. FIG. 2 illustrates the server certificate issued by the management PC 30a in accordance with the first embodiment of the present invention.

As shown in FIG. 2, the server certificate issued by the management PC 30a includes version information indicating a certificate version, a serial number of the certificate, an algorithm identifier, issuer information indicating the issuer of the digitally signed certificate, validity period information indicating a validity period of the certificate, subject information indicating the owner of the certificate (i.e., an MFP 10 as a target device to which the issued certificate will belong), public key information indicating the information regarding the public key, and digital signature information indicating a digital signature value.

The management PC 30a in the communication system 1 of the first embodiment issues to the MFP 10 the server certificate having the validity period information indicating that the server certificate is valid for, for example, one year after the time of its issuance. The subject information in the server certificate is provided with a common name, which is a node ID (an IP address) of the target device, and the IP address as the common name also represents owner ID information to identify the device (the MFP 10) for which the certificate is issued.

It should be noted that each PC 30 is configured to judge as to whether the server certificate transmitted from the MFP 10 is valid based on the digital signature information, the validity period information, and the subject information, as the SSL communication with the MFP 10 is conducted. For example, if an IP address in the subject information is different from the IP address of the sender (source) MFP 30 which has sent the current server certificate, the PC 30 determines that the current server certificate is invalid. In this regard, communication security may not be maintained. Accordingly, the PC 30 terminates the SSL communication with the MFP 10. The digital signature information and the validity period information can also be used to judge as to whether the server certificate is valid, but these technical details, which are well known in the art, are omitted herein.

Figure 3A:
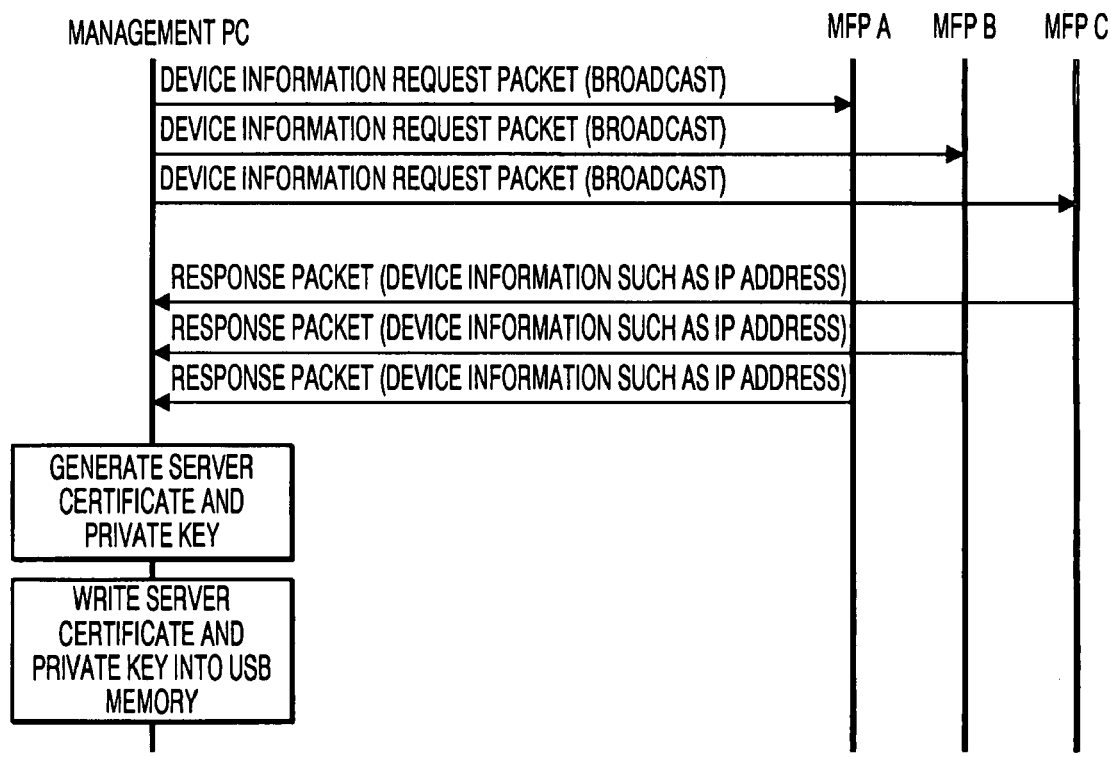
FIGS. 3A and 3B illustrate a method of creating the server certificate in accordance with the first embodiment of the present invention.
Figure 3B:
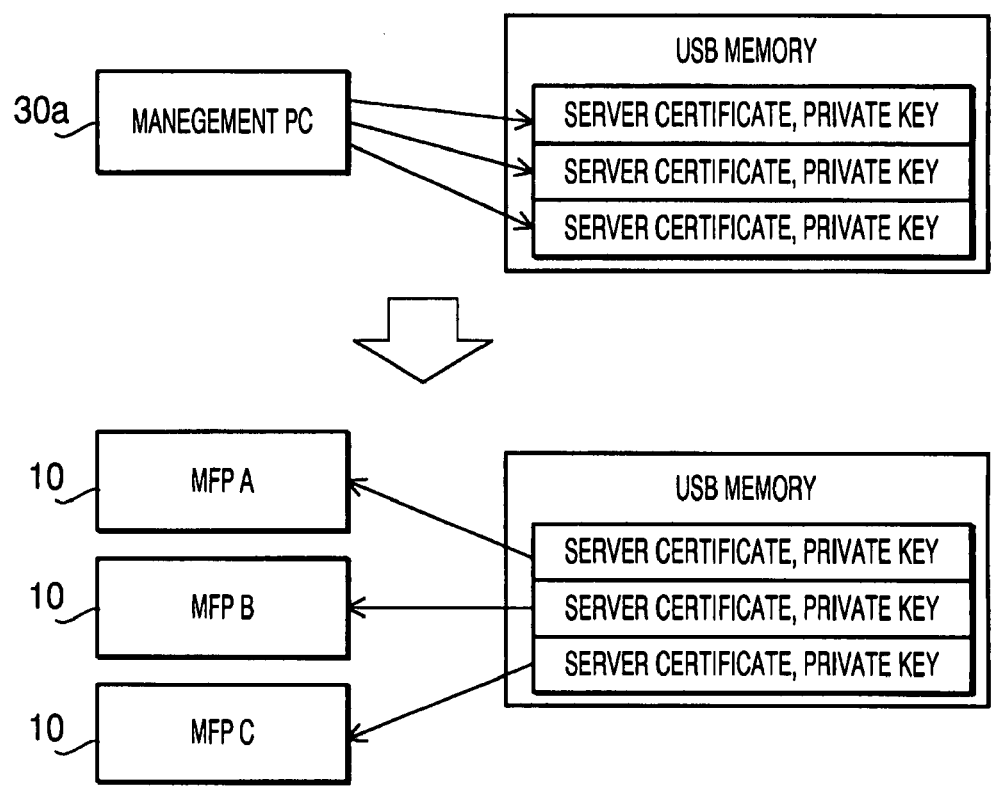

Next, a method of the management PC 30a to create the server certificate and how to deliver the created server certificate to the MFP 10 will be described. FIGS. 3A and 3B illustrate a method of creating the server certificate in accordance with the first embodiment of the present invention. Specifically, FIG. 3A is a ladder chart illustrating a procedure for the management PC 30a to create the server certificate, and FIG. 3B illustrates a configuration of a certificate file stored in the USB memory 50 according to the embodiment of the invention.

As described above, in order to issue a server certificate, the management PC 30a requires an IP address of a target device to which the server certificate is to be issued, as the owner ID information. In the present embodiment, the management PC 30a acquires this information through the network NT from each MFP 10 to which the server certificate is to be issued.

More specifically, the management PC 30a in the communication system 1 broadcasts device information request packets to respective MFPs 10 through the network NT. When each MFP 10 receives the device information request packet, the MFP 10 in the communication system 1 returns a response packet containing the IP address of itself to the management PC 30a which has sent the device information request packet. Accordingly, when the management PC 30a broadcasts device information request packets through the network NT, response packets are returned from the MFP 10 that are in a range of the network NT to receive the broadcast packets.

When the response packet is received, the management PC 30a generates a public key and a private key for each MFP 10 which has sent the response packet, and issues a server certificate corresponding to the public key, in which the owner ID information, i.e., the IP address of the MFP 10 indicated in the response packet, is written. Then the management PC 30a combines the server certificate issued to the sender MFP 10 and the private key corresponding to the server certificate into a data file, which is stored into the USB memory 50 connected to the USB connector 41. (The data file containing the server certificate and the private key is hereinafter referred to as a "certificate file"). It should be noted that every certificate file issued for each device is collectively written into the USB memory 50 (see the upper block in FIG. 3B).

As described above, according to the present embodiment, the USB memory 50 having the plurality of certificate files is connected to the USB connector 23 for each MFP 10, so that the server certificate and the private key corresponding to the MFP 10 to which the USB memory 50 is connected are delivered to the MFP 10 (see the lower block in FIG. 3B). It should be noted that the MFPs 10 according to the present embodiment are capable of automatically detecting and installing the certificate file for itself to search the USB memory 50 for the certificate file containing the server certificate and the private key issued to itself. Accordingly, each MFP 10 can select the correct server certificate and the private key among a plurality of certificate files stored in the USB memory 50.

Figure 4:
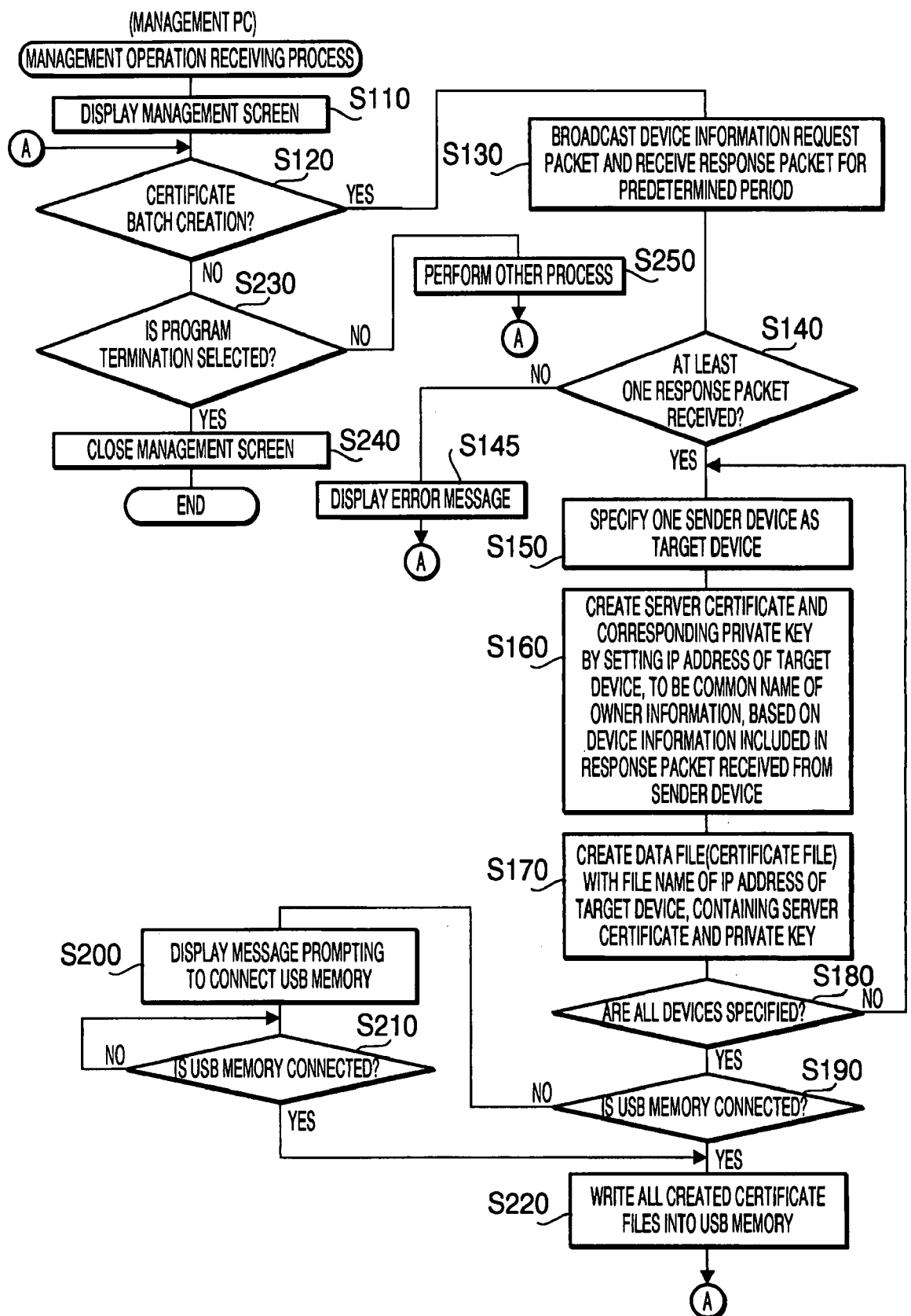
FIG. 4 is a flowchart illustrating a managing operation receiving process performed by a CPU 31 of the management PC 30a in accordance with the first embodiment of the present invention.
Figure 5:
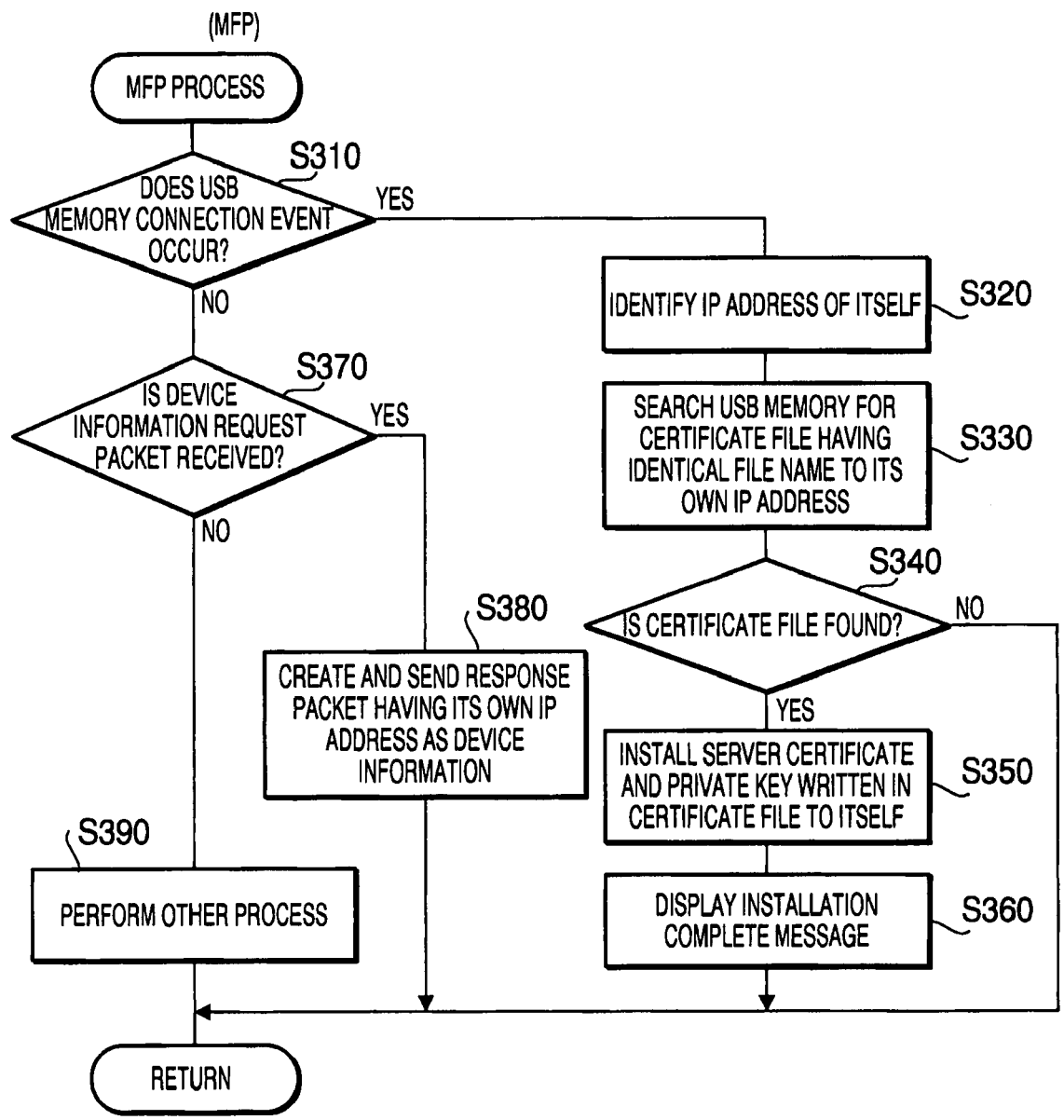
FIG. 5 is a flowchart illustrating an MFP (multifunction peripheral) process to be repeatedly performed by the CPU 11 of an MFP 10 in accordance with the first embodiment of the present invention.

Next, a procedure for the management PC 30a to generate the server certificate and a procedure for the MFP 10 to install the server certificate will be described with reference to the accompanying flowcharts. FIG. 4 is a flowchart illustrating the managing operation receiving process performed by the CPU 31 of the management PC 30a in accordance with the present embodiment of the present invention. FIG. 5 is a flowchart illustrating the MFP process to be repeatedly performed by the CPU 11 of the MFP 10 in accordance with the present embodiment of the present invention.

When a user operates the operation unit 37 of the management PC 30a and enters a command to execute a management program stored in the HDD 34, the CPU 31 of the management PC 30a executes the management program to perform the managing operation receiving process shown in FIG. 4.

As the managing operation receiving process starts, the CPU 31 displays a management screen on the display unit 39 (S110). The management screen provides GUI (Graphical User Interface) to the user so that batch creation of a plurality of server certificates (a certificate batch creation) and program termination can be entered by the user. Then, a determination is made as to whether the user selects the certificate batch creation on the management screen by operating a pointing device of the management PC 30a (S120). If a determination is made that the user selected the certificate batch creation (S120: YES), the process moves to S130, wherein the CPU 31 broadcasts the device information request packets over the network NT through the communication interface 35 and receives a response packet through the communication interface 35 transmitted from the MFP 10 which received the device information request packet. It should be noted that the time for the management PC 30a to wait for the response packets may be limited to a predetermined period of time.

After the predetermined period of time has elapsed, the process moves to S140, wherein a determination is made as to whether at least one response packet has been received through the communication interface 35 within the predetermined period of time. If a determination is made that no response packet has been received (S140: NO), the process moves to S145, wherein an error message is displayed in a message display area of the management screen, indicating that there is no MFP 10 in the network NT, then the process returns to S120.

If a determination is made that at least one response packet has been received within the predetermined period of time (S140: YES), the process moves to S150, wherein a sender MFP 10 is specified as a target device (MFP) to which the server certificate is to be issued among a group of MFPs 10, each of which has sent response packet. Then, the process moves to S160, wherein a public key and a private key are generated for the specified target device, and simultaneously the device information such as an IP address of the target device written in the response packet is used to create the server certificate for the target device. The server certificate is used as an electronic certificate corresponding to the public key generated as above.

Specifically, the IP address included in the response packet transmitted from the specified target device is set as a common name of the subject information. Thus, the server certificate indicating the owner device of the IP address to be the device to which the server certificate will belong (i.e., the target device) is created. In the present embodiment, the server certificate is provided with one-year validity period.

Then, the process moves to S170, wherein the server certificate and the corresponding private key generated in S160 as above are combined into one file to create a certificate file. It should be noted that the IP address of the target device is used as a name of a certificate file. For example, if the IP address of the target device is 192.168.0.100, the certificate file is named (labeled) as "IP192168000100".

After S170, the process moves to S180, wherein a determination is made as to whether all of the sender MFP 10, each of which has respectively sent a response packet within the predetermined period of time, have already been specified as a target device respectively in S150. If a sender MFP 10 remains unspecified (S180: NO), the process retunes to S150, wherein one of the unspecified sender MFP 10 is specified as a target device to continue the processes starting in S160.

In S180, if a determination is made that all the sender devices have been specified as target devices (S180: YES), the process moves to S190, wherein a determination is made as to whether the USB memory 50 is connected to the USB connector 41. If a determination is made that the USB memory 50 is not connected to the USB connector 41 (S190: NO), a message is displayed in the message display area of the management screen, prompting the user to connect the USB memory 50 to the USB connector 41 (S200). Then, the process moves to S210 and waits until the USB memory 50 is connected to the USB connector 41. When the USB memory 50 is connected to the USB connector 41 (S210: YES), the process moves to S220. If a determination is made that the USB memory 50 has been connected to the USB connector 41 (S190: YES), the process moves to S220 without executing the steps S200-S210.

In S220, the CPU 31 writes every certificate file created in S170 for each sender MFP 10 which has returned the response packet into the USB memory 50 connected to the USB connector 41. Then, the process returns to S120.

In S120, if a determination is made that the certificate batch creation is not entered (S120: NO), the process moves to S230, wherein a determination is made as to whether the user selects the program termination on the management screen by operating the pointing device. If a determination is made that the program termination has been selected (S230: YES), the process moves to S240, wherein the management screen is closed, and the managing operation receiving process is terminated.

In S230, if a determination is made that the program termination has not been selected (S230: NO), the process moves to S250, wherein the other process is performed, and then returns to S120. In S250, a process according to the user operation is performed. If there is no user operation or process to be performed, the process returns to S120 without executing any steps. As described above, the management PC 30a uses the management program to perform the managing operation receiving process.

Next, the MFP process to be repeatedly performed by the CPU 11 of the MFP 10 will be described with reference to FIG. 5. When the MFP process starts, the CPU 11 judges as to whether an event indicating that the USB memory 50 is connected to a USB connector 23 of the MFP 10 has occurred. If a determination is made that the event has occurred (S310: YES), the process moves to S320. If the USB memory 50 is not connected to the USB connector 23, or if it is not immediately after the USB memory 50 is connected (S310: NO), a determination is made that no connection event occurred, and the process moves to S370.

In S320, the CPU 11 determines the IP address assigned to itself based on information regarding the IP address indicated by the communication configuration data stored in the flash memory 13. Then, in S330, the CPU 11 searches the USB memory 50 connected to the USB connector 23 for the certificate file with the file name indicating the same IP address assigned to itself. It should be noted that an extension may be used to judge as to whether the data file is a certificate file.

As a result of the search, if a certificate file with the same file name as the IP address assigned to the current MFP 10 is found in the USB memory 50, a determination is made that a certificate file as the searched object is present in the USB memory 50 (S340: YES), and the process moves to S350. If a certificate file with the same file name as the IP address assigned to the current MFP 10 is not found in the USB memory 50, a determination is made that the certificate file as the searched object is not present in the USB memory 50 (S340: NO). Then the MFP process terminates and the process returns to S310.

In S350, the CPU 11 reads the certificate file, which is stored in the USB memory 50 and of which file name corresponds to the IP address assigned to itself and writes the server certificate and the private key stored in this certificate file into the flash memory 13 to install in itself. As a result, the server certificate and the private key are usably installed for SSL communication.

Thereafter, the process moves to S360, wherein a message is displayed in the display area of the display operation unit 21, indicating that installation is complete. Then, the MFP process terminates. In S310, if a determination is made that no event indicating that the USB memory 50 is connected to the USB connector 23 of the MFP 10 has occurred (S310: NO), the process moves to S370, where the CPU 11 judges as to whether the device information request packet is received through the communication interface 15. If the CPU 11 determines that the device information request packet has been received (S370: YES), the process moves to S380, wherein a response packet is created in response to the device information request packet transmitted from the management PC 30a. More specifically, the IP address assigned to the current MFP 10 (i.e., the IP address set in the communication configuration data) is written as the device information into the response packet which is returned to the management PC 30a as the sender of the device information request packet, through the communication interface 15. Then the MFP process terminates.

In S370, if the CPU 11 determines that no device information request packets has been received (S370: NO), the process moves to S390, wherein a process corresponding to the other event is performed. Then the MFP process terminates. It should be noted that if there is no event or no process to be performed in S390, the MFP process terminates without executing any steps, and the process returns to S310.

As described above, the communication system 1 according to the first embodiment of the present invention includes the management PC 30a which acquires the IP address as the device information from every MFP 10, i.e., the target device, to which a server certificate is to be issued, through the network NT in response to the user command and creates the server certificate and a private key based on the acquired IP address for each of the MFPs 10. The server certificate and the private key are combined into a certificate file with a file name indicating the IP address of the addressed MFP 10. The certificate file is written into the USB memory 50. Each MFP 10 automatically selects its own certificate file among a plurality of certificate files stored in the USB memory 50 based on the file name. The selected certificate file which contains the server certificate and the private key issued to itself is then installed.

According to the present embodiment, the server certificate and the private key can be properly installed in each MFP 10 as the user operates the management PC 30a to execute the certificate batch creation and write certificate files corresponding to each of the MFPs 10 into the USB memory 50, and connect the USB memory 50 to each of the MFPs 10.

Thus, a plurality of certificates and private keys can be installed in the MFPs 10. Accordingly, correct server certificates and correct private keys can easily be installed in the MFPs 10 for the SSL communication to prevent wrong server certificates from being installed in the MFPs 10 which may have conventionally been caused by human errors.

According to the present embodiment, the server certificate and the private key are collectively included in a single certificate file which is written into the USB memory 50 so that each of the MFPs 10 can easily find the corresponding server certificate and the private key. In addition, the IP address of the addressed MFP 10 is used as the file name of the certificate file so that each MFP 10 can easily find the corresponding server certificate and the private key issued to itself.

Second Embodiment

Figure 6:
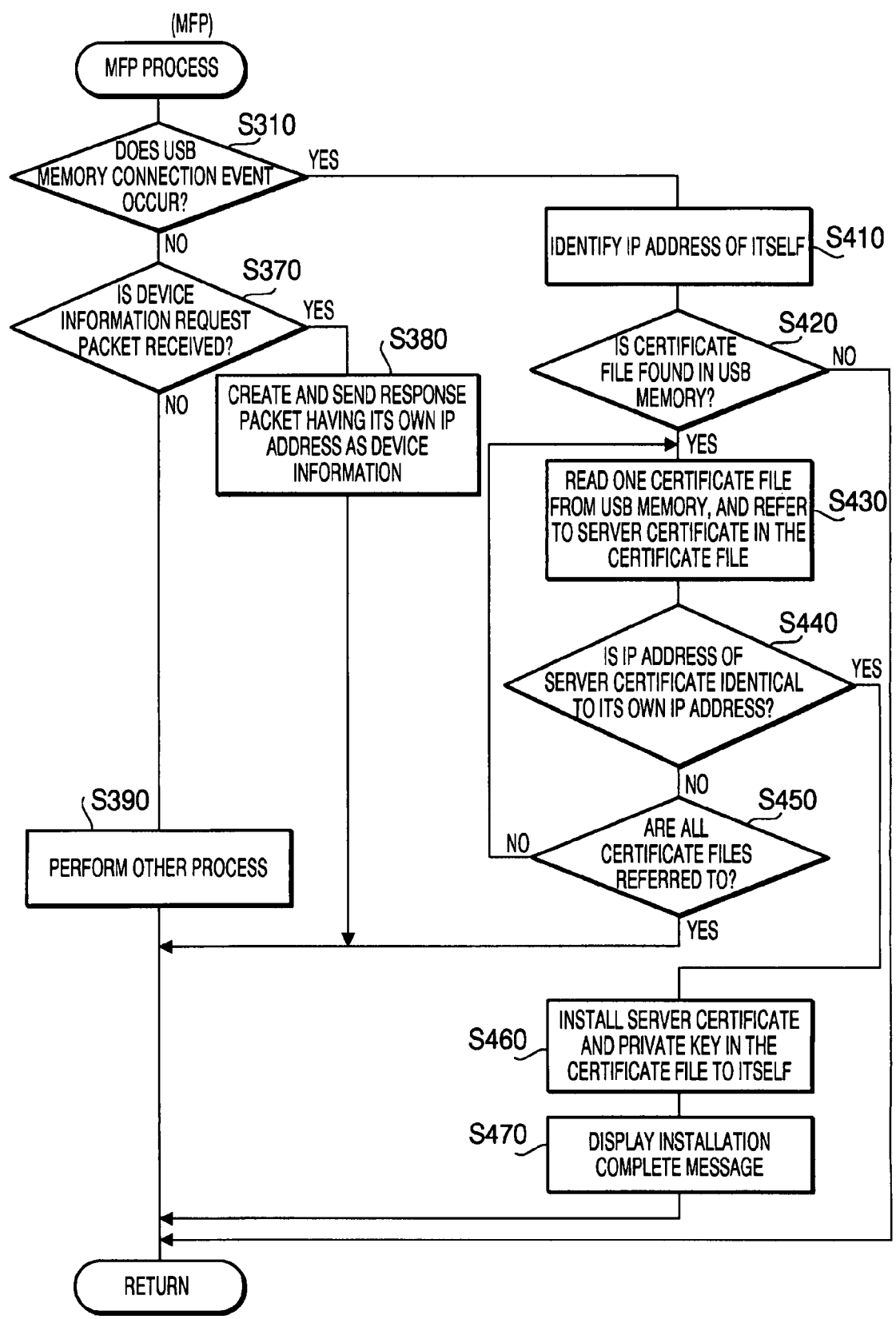
FIG. 6 is a flowchart illustrating an MFP process to be repeatedly performed by the CPU 11 of the MFP 10 in accordance with a second embodiment of the present invention.

Hereinafter, referring to FIG. 6, a second embodiment of the present invention will be described. FIG. 6 is a flowchart illustrating an MFP process to be repeatedly performed by the CPU 11 of the MFP 10 in accordance with a second embodiment of the present invention. It should be noted that the communication system 2 (see FIG. 1) in accordance with the second embodiment shown in FIG. 6 is configured to be similar to the communication system 1 of the first embodiment except that an IP address is not used as the file name of a certificate file and the MFP process to be performed by the CPU 11 of the MFP 10 is different. An element configuring the communication system 2 which is similar to the configuration of the previous embodiment is referred to by an identical reference numeral, and description of that will be omitted. Accordingly, the following description will focus merely on the content of the MFP process which is shown in FIG. 6.

When the MFP process starts, in S310, the CPU 11 judges as to whether an event indicating that the USB memory 50 is connected to the USB connector 23 of the MFP 10 has occurred. If it is determined that no event occurred (S310: NO), the process moves to S370 and executes the following steps (S370-S390) and terminates the MFP process.

In 310, if a determination is made that an event indicating that the USB memory 50 is connected to the USB connector 23 of the MFP 10 has occurred (S310: YES), the process moves to S410, wherein the CPU 11 identifies the IP address assigned to itself based on information regarding the IP address indicated by the communication configuration data stored in the flash memory 13. Then, the CPU 11 judges as to whether a certificate file is stored in the USB memory 50 connected to the USB connector 23 (S420). It should be noted that the extension of the data file may be used for a determination as to whether the data file in the USB memory 50 is a certificate file is made. Alternatively, the above determination may be made based on an assumption that all data files stored in a predetermined directory for storing certificate files are certificate files.

If a determination is made that no certificate file is present in the USB memory 50 (S420: NO), the CPU 11 terminates the MFP process without executing any steps S430-S470.

If a determination is made that a certificate file is present in the USB memory 50 (S420: YES), the process moves to S430, wherein the CPU 11 reads the certificate file from the USB memory 50. Then, the CPU 11 searches the read certificate file for the subject information of the server certificate to judge as to whether the IP address assigned to itself is set to be the common name of the subject information written in the server certificate (S440).

If a determination is made that the IP address assigned to the MFP 10 itself is not set to be the common name (S440: NO), the process moves to S450, wherein a determination is made as to whether all the certificate files in the USB memory 50 have been read in S430. If a determination is made that all the certificate files have been read (S450: YES), the MFP process terminates.

If a determination is made that not all the certificate files have been read (S450: NO), the process returns to S430, wherein the CPU 11 reads a certificate file from the USB memory 50. Then, the CPU 11 searches the read certificate file for the subject information of the server certificate to determinate as to whether the IP address assigned to the MFP 10 itself is set to be the common name of the subject information written in the server certificate (S440).

If a determination is made that the IP address assigned to itself is set to be the common name of the subject information written in the server certificate (S440: YES), the process moves to S460, wherein the CPU 11 writes the certificate file containing the server certificate and the private key into the flash memory 13 of itself. Then, the process moves to S470, wherein a message is displayed in the display area of the display operation unit 21, indicating that installation is completed. Then, the MFP process terminates.

In the communication system 2 as described above, the MFP 10 refers to the subject information of a server certificate to determinate as to whether the certificate file contains the server certificate and the private key to be installed. Accordingly, in the present embodiment, the MFP 10 can select a correct certificate file and install the correct server certificate and private key to be installed to itself.

Third Embodiment

Figure 7:
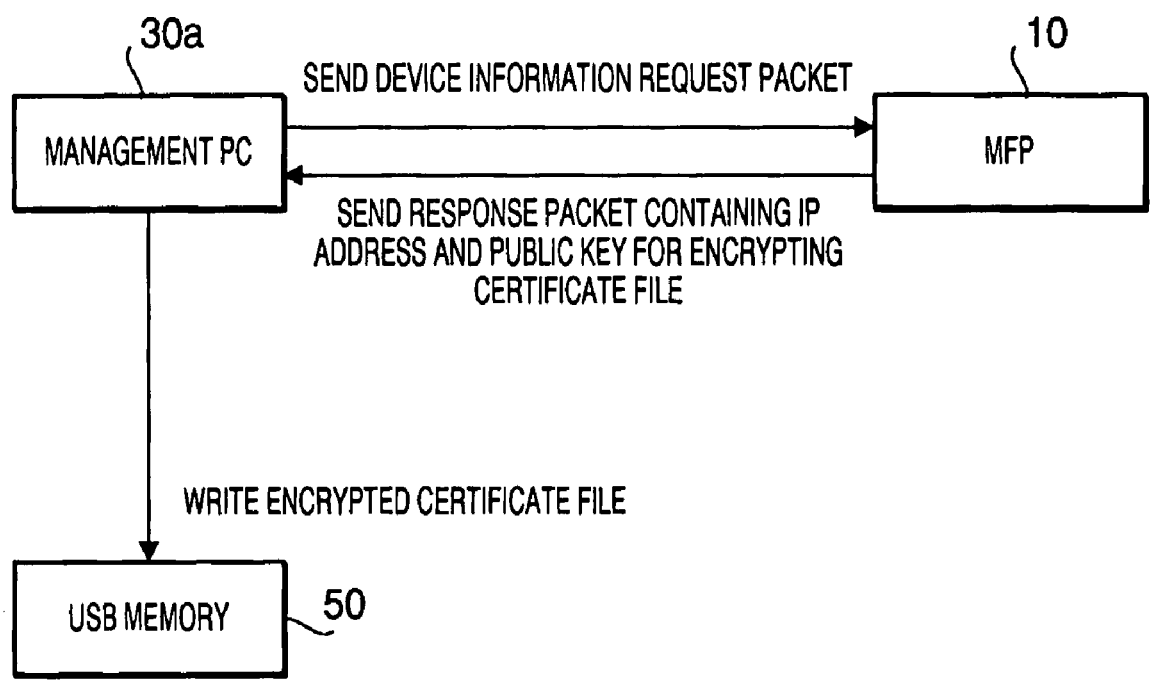
FIG. 7 is a schematic diagram illustrating a method of creating a certificate file in accordance with a third embodiment of the present invention.
Figure 8:
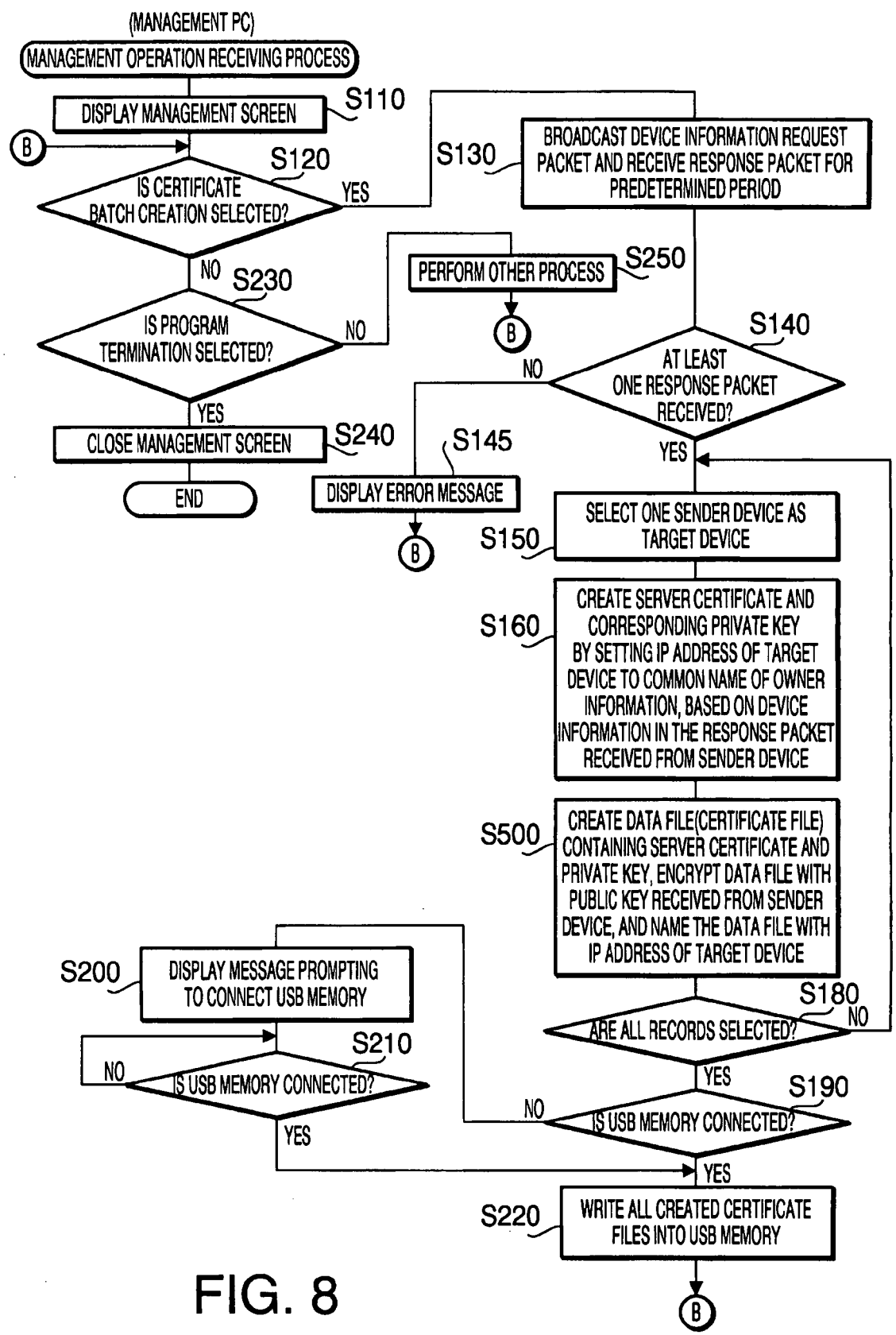
FIG. 8 is a flowchart illustrating the managing operation receiving process to be performed by a CPU 31 of a management PC 30a in accordance with the third embodiment of the present invention.
Figure 9:
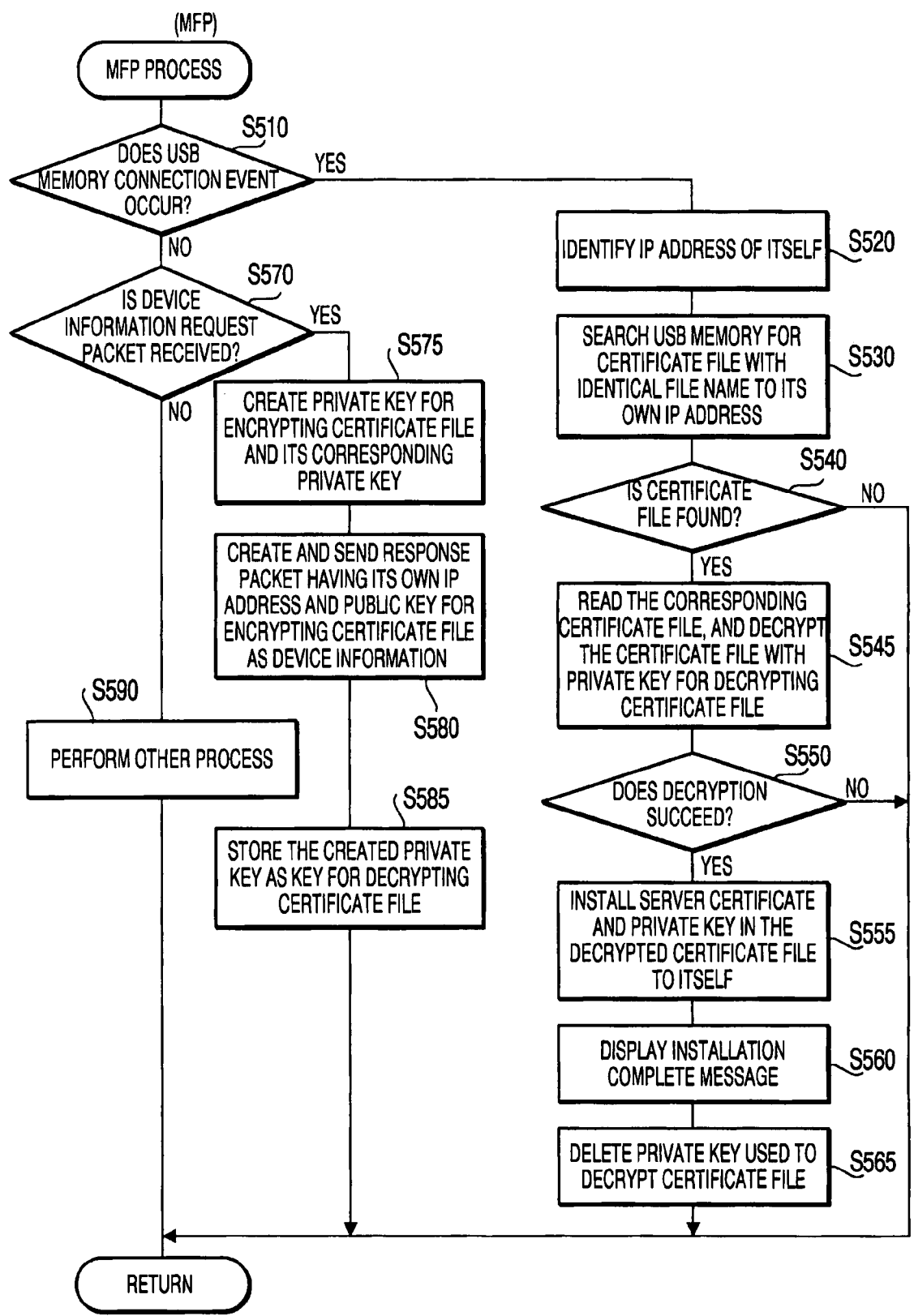
FIG. 9 is a flowchart illustrating an MFP process to be repeatedly performed by the CPU 11 of the MFP 10 in accordance with the third embodiment of the present invention.

Hereinafter, referring to FIGS. 7-9, a third embodiment of the present invention will be described. FIG. 7 is a schematic diagram illustrating a method of creating a certificate file in accordance with the third embodiment of the present invention. FIG. 8 is a flowchart illustrating a managing operation receiving process to be performed by the CPU 31 of the management PC 30a in accordance with the third embodiment of the present invention. FIG. 9 is a flowchart illustrating an MFP process to be repeatedly performed by the CPU 11 of the MFP 10 in accordance with the third embodiment of the present invention.

A communication system 3 in accordance with the third embodiment is similar to the communication system 1 in the first embodiment, but differs in content of the managing operation receiving process to be performed by the CPU 31 of the management PC 30a and the MFP process to be performed by the CPU 11 of the MFP 10. Accordingly, the following description will focus only on the aspects which are different from the communication system 1 in accordance with the first embodiment.

Operations of the management PC 30a and the MFP 10 configuring the communication system 3 in accordance with the third embodiment will be described with reference to FIG. 7. In the present embodiment, when a device information request packet is transmitted from the management PC 30a, the MFP 10 creates a public key and a private key as a key pair which are used to encrypt and decrypt a certificate file and stores the private key as a key for decrypting the certificate file. Meanwhile, the public key is stored together with the IP address of the MFP 10 itself in a response packet corresponding to the device information request packet as a key for encrypting the certificate file. The MFP 10 then transmits the response packet in response to the device information request packet to the management PC 30a. The management PC 30a uses the public key stored in the response packet transmitted from the MFP 10 to encrypt the certificate file to be issued to the MFP 10 and stores the encrypted certificate file for each MFP 10 to the USB memory 50. Thus, in the present embodiment, the certificate file is encrypted to be delivered to the MFPs 10.

More specifically, a managing operation receiving process to be performed by the management PC 30a in the third embodiment is similar to the managing operation receiving process in the first embodiment, but differs in that S170 is replaced with S500 for encrypting a certificate file (see FIG. 8). In S500, a server certificate and its corresponding private key created in S160 are combined into a single data file. In this regard, the public key stored in the response packet transmitted from the addressed MFP 10 is used to encrypt the content of the data file.

Further, the IP address of the addressed MFP 10 is used as a file name of the certificate file. For example, if the IP address of the addressed MFP 10 is 192.168.0.100, the certificate file will be labeled "IP192168000100". When the above step is completed, the process returns to S180.

Meanwhile, in the MFP 10, the CPU 11 repeatedly performs the following MFP process (see FIG. 9). When the MFP process starts, the CPU 11 judges as to whether an event indicating that the USB memory 50 is connected to the USB connector 23 of the MFP 10 has occurred (S510). If a determination is made that such an event has occurred (S510: YES), the process moves to S520. If a determination is made that no event has occurred (S510: NO), the process moves to S570.

In S520, the CPU 11 identifies the IP address assigned to the MFP 10 itself. Then, the CPU 11 searches the USB memory 50 connected to the USB connector 23 for a certificate file with a file name indicating the IP address assigned to itself (S530).

As a result of the search, if a certificate file with the file name indicating the IP address assigned to itself is found in the USB memory 50, a determination is made that the certificate file being searched for is present in the USB memory 50 (S540: YES), and the process moves to S545. If the certificate file with the file name indicating the IP address assigned to itself is not found in the USB memory 50, a determination is made that the certificate file being searched for is not present in the USB memory 50 (S540: NO). Then the MFP process terminates.

In S545, the CPU 11 reads the certificate file with the file name indicating the IP address assigned to itself from the USB memory 50 and decrypts the certificate file with the private key stored in the flash memory 13 of the MFP 10. If the decryption succeeds (S550: YES), the process moves to S555, wherein the CPU 11 writes the server certificate and the private key in the decrypted certificate file into the flash memory 13, thereby installing the server certificate and the private key to the MFP 10 itself. Then, the process moves to S560, wherein a message is displayed in the display area of the display operation unit 21, indicating that installation is completed. Then, the process moves to S565, wherein the private key used to decrypt the certificate file is deleted from the flash memory 13. When the processing is completed at S565, the MFP process terminates.

If the decryption does not succeed (S550: NO), the CPU 11 is unable to decode the server certificate and the private key that are stored in the certificate file. Accordingly, the CPU 11 terminates the MFP process without installing the server certificate and the private key.

In S510, if a determination is made that no connection event has occurred (S510: NO), the process moves to S570, wherein the CPU 11 judges as to whether a device information request packet is received by the MFP 10 itself through the communication interface 15. If a determination is made that a device information request packet has been received (S570: YES), the process moves to S575, wherein a public key for encrypting a certificate file and its corresponding private key are created.

Then the process moves to S580, wherein a response packet having of the IP address of the MFP 10 itself and the public key for encrypting the above-created certificate file as the device information is created and the response packet is sent to the management PC 30a which has sent the device information request packet through the communication interface 15 (S580).

Then the process moves to S585, wherein the private key, which was created in S575, as one of the key pair for encrypting the certificate file, is stored in the flash memory 13 as a private key for decrypting the certificate file. Then, the MFP process terminates.

If a determination is made that no device information request packet has been received (S570: NO), the process moves to S590, wherein the CPU 11 performs a process corresponding to an event occurred previously. Then the MFP process terminates. It should be noted that if there is no event or no process to be performed in S590, the MFP process terminates without executing any process, and the process returns to S510.

The above describes a communication system 1 according to the third embodiment of the present invention. In the present embodiment, the communication system 3 encrypts a certificate file and writes the encrypted certificate file into a USB memory 50. Accordingly, a plurality of certificate files are stored in the USB memory 50, and the USB memory 50 is passed to users of MFPs 10 respectively, thereby preventing malicious users from wrongfully using the server certificates and the private keys.

Specifically, according to the present embodiment, an MFP 10 generates a private key and a public key and transmits the public key to the management PC 30a, which uses the transmitted public key to encrypt a certificate file. It is difficult to decode the certificate file without using the private key, thus strengthening to prevent malicious users from wrongfully using the certificate file. In addition, in the present embodiment, a password is not used for encrypting a certificate file so that the users are not required to memorize the password for decrypting the certificate file, thus enabling a simply-usable communication system 3.

Fourth Embodiment

Figure 10:
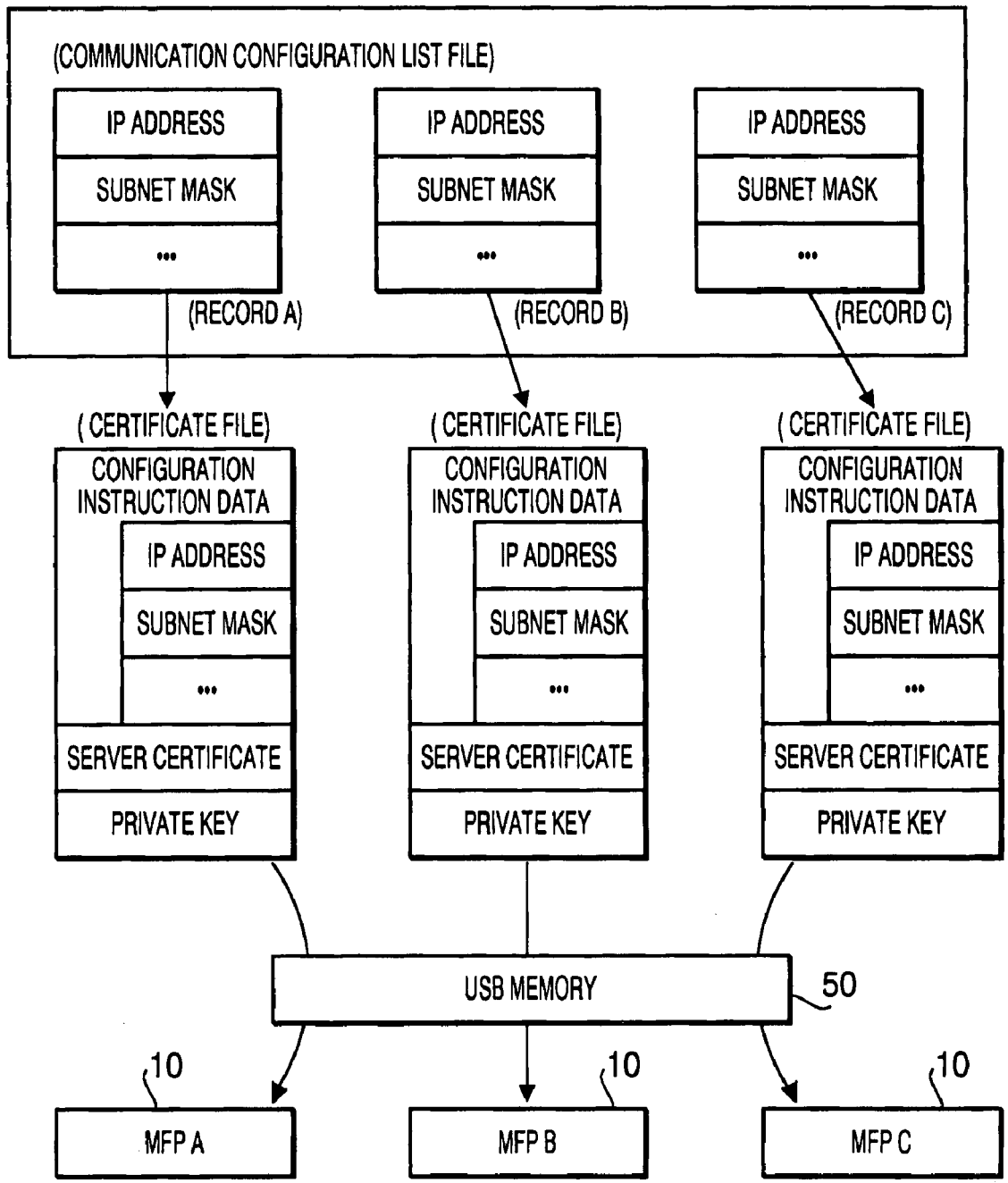
FIG. 10 is a schematic diagram illustrating a method of creating a certificate file in accordance with a fourth embodiment of the present invention.
Figure 11:
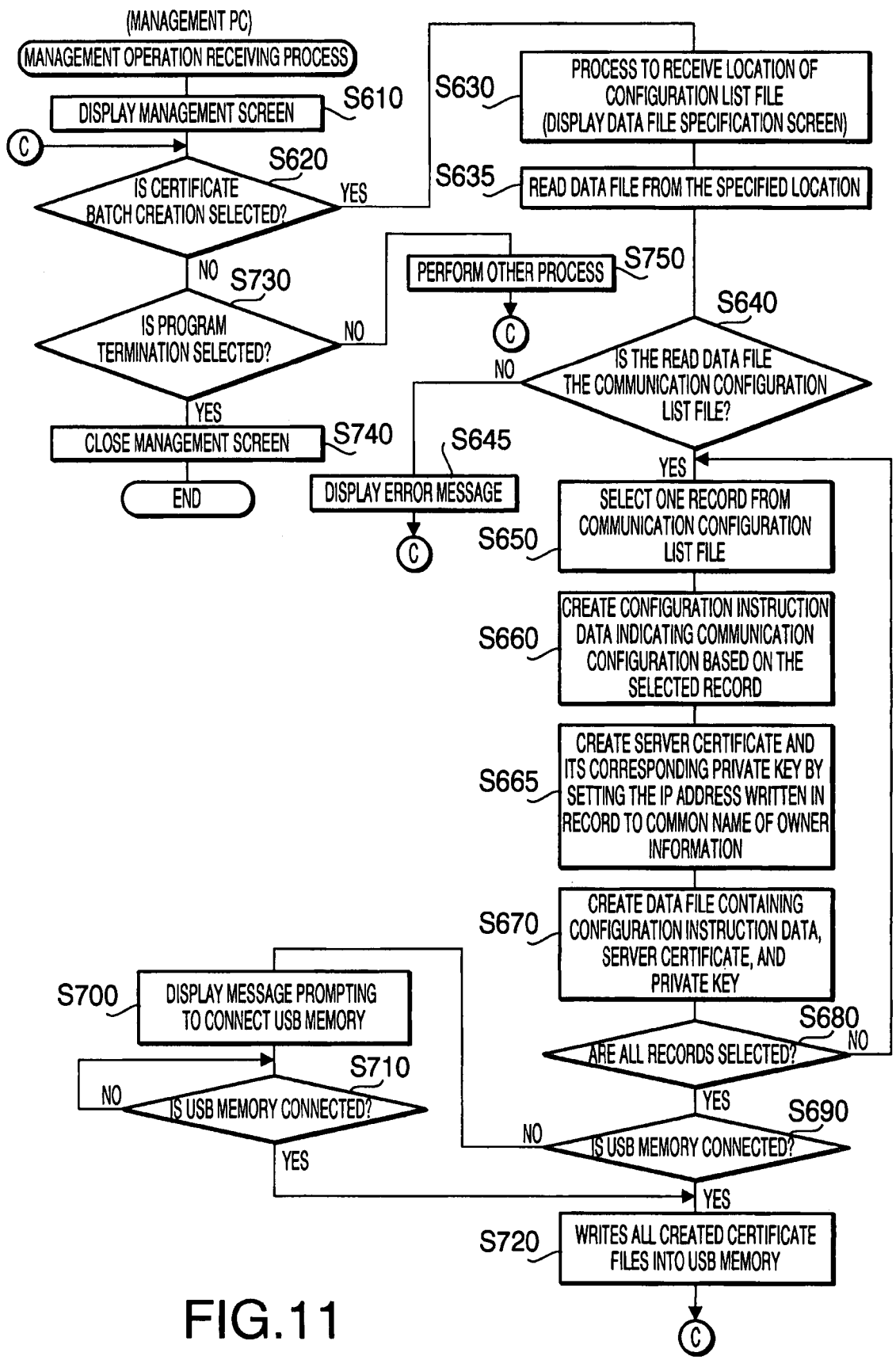
FIG. 11 is a flowchart illustrating the managing operation receiving process to be repeatedly performed by the CPU 31 of the management PC 30a in accordance with the fourth embodiment of the present invention.
Figure 12:
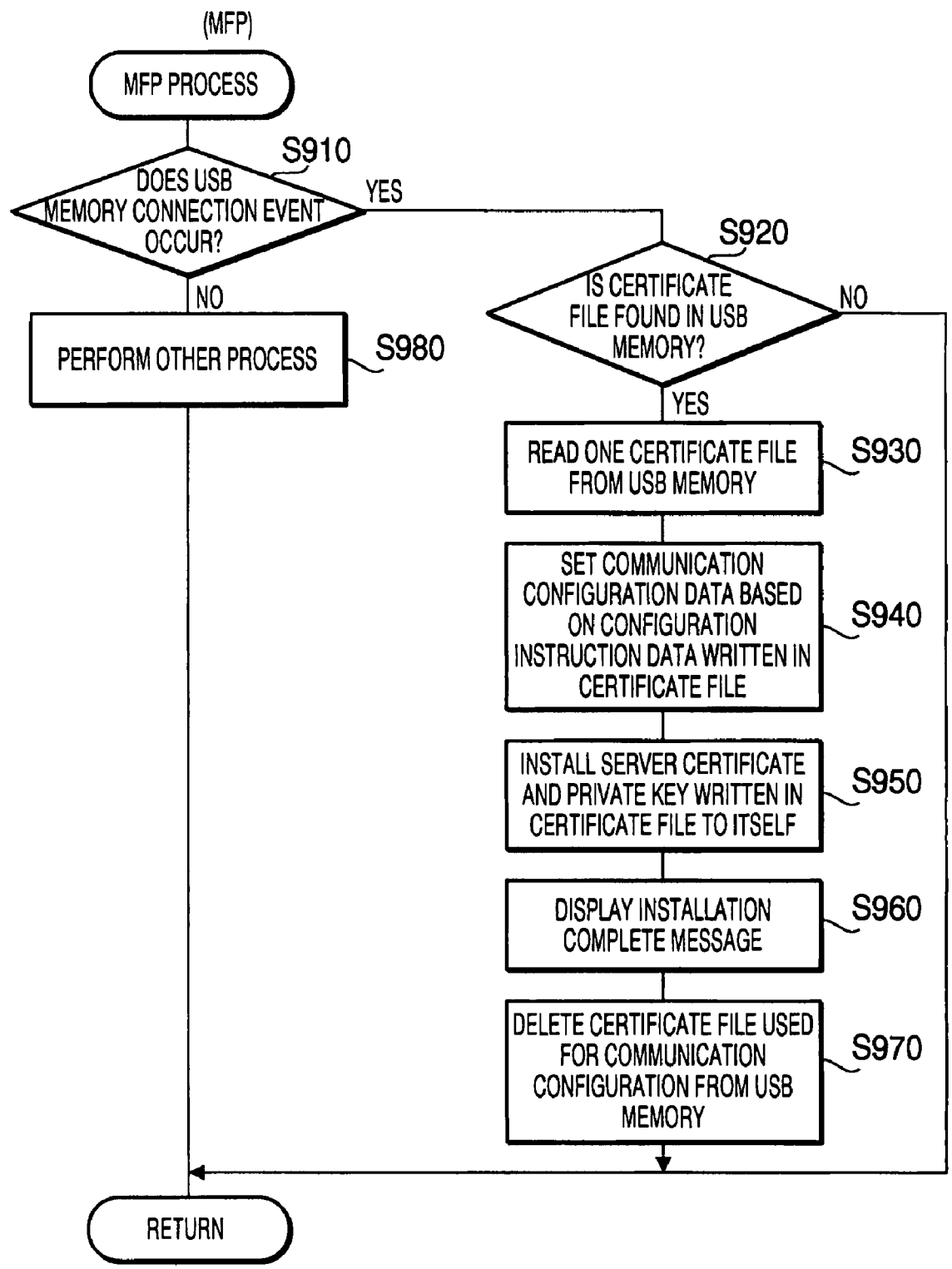
FIG. 12 is a flowchart illustrating the MFP process to be repeatedly performed by the CPU 11 of the MFP 10 in accordance with the fourth embodiment of the present invention.

Hereinafter, referring to FIGS. 10-12, a fourth embodiment of the present invention will be described. FIG. 10 is a schematic diagram illustrating a method of creating a certificate file in accordance with the fourth embodiment of the present invention. FIG. 11 is a flowchart illustrating the managing operation receiving process to be repeatedly performed by the CPU 31 of the management PC 30a in accordance with the fourth embodiment of the present invention. FIG. 12 is a flowchart illustrating the MFP process to be repeatedly performed by the CPU 11 of the MFP 10 in accordance with the fourth embodiment of the present invention.

A communication system 4 in accordance with the fourth embodiment is similar to the communication system 1 in the first embodiment, but differs in a structure of a certificate file and in content of the managing operation receiving process to be performed by the CPU 31 of the management PC 30a, and in the MFP process to be performed by the CPU 11 of the MFP 10. Accordingly, the following description will focus only on the aspects different from the communication system 1 in the first embodiment.

When the managing operation receiving process starts, the CPU 31 displays a management screen, which is substantially similar to the management screen shown in S110 described in the previous embodiments (S610). Then, a determination is made as to whether the user operates a pointing device to select the certificate batch creation on the management screen (S620). If a determination is made that a user selects the certificate batch creation (S620: YES), the process moves to S630, wherein the data file specification screen is displayed on the management screen and waits for the user to specify a location of a communication configuration list file to be read.

The communication configuration list file is stored in the HDD 34 and contains a list of communication configuration data created for each target device (MFP 10) to which an issued server certificate will belong. More specifically, the communication configuration list file includes records, each of which indicates communication configuration defined by a user for the target device in a CSV (comma separated value) format. Each record contains an IP address, a subnet mask, a default gateway, and the like, which are set for the target devices respectively.

In S630, when the user operates the operation unit 37 to enter the information to specify the location of the communication configuration list file, the process moves to S635, wherein the specified data file is read from the HDD 34. Then the process moves to S640, wherein a determination is made as to whether the read data file is a communication configuration list file.

In S640, if it is determined that the read data file is not a communication configuration list file (S640: NO), the process moves to S645, wherein an error message is displayed in the message display area of the management screen, indicating that the data file is not a communication configuration list file, and the process returns to S620.

In S640, if it is determined that the read data file is a communication configuration list file (S640: YES), the process moves to S650, wherein one of the plurality of records in the communication configuration list file, which has not been selected previously in the management operation receiving process, is arbitrarily selected. Then, the process moves to S660, wherein configuration instruction data indicating an instruction to apply the communication configuration indicated in the record for one of the MFPs 10 is created. More specifically, information for configuring communication of the MFP 10 such as an IP address, a subnet mask, a default gateway, and the like, is created in a predetermined format.

The process moves to S665, wherein a public key and a private key to establish secure communication for the MFP 10 in the network NT are generated. Further, a server certificate corresponding to the public key is generated. The subject information included in the server certificate is provided with a common name, which is represented by an IP address of the MFP 10 corresponding to the record selected in S650. Thus, the server certificate to belong to the MRP 10 with the IP address indicated in the selected record is generated. In the present embodiment, a validity period for the server certificate is configured to be, for example, one year similarly to the validity period described in the first embodiment.

Then the process moves to S670, wherein the configuration instruction data created in S660, the server certificate, and its corresponding private key created in S665 are combined into a single data file as a certificate file.

Then the process moves to S680, wherein it is judged as to whether all records in the communication configuration list file have been selected in S650. If there is at least one unselected record (S680: NO), the process returns to S650, wherein one of the unselected records is selected to continue the steps S660-680.

In S680, if all of the records have been selected (S680: YES), the process moves to S690, wherein it is judged as to whether the USB memory 50 is connected to the USB connector 41. If is it determined that the USB memory 50 is not connected to the USB connector 41 (S690: NO), the process moves to S700 and then to S710, in which are similar to S200 and S210 of the first embodiment. Then the process moves to S720. If a determination is made that the USB memory 50 is connected to the USB connector 41 (S690: YES), the process moves to S720.

In S720, all the certificate files created corresponding to each record in the communication configuration list file are written into the USB memory 50 which is connected to the USB connector 41. The process returns to S620.

In S620, if a determination is made that the user does not select the certificate batch creation (S620: NO), the process moves to S730, wherein a step similar to S230 in the first embodiment is performed (see FIG. 4). If the process moves to S750, a step similar to S250 in the first embodiment is performed. Then the process returns to S620. If the process moves to S740, a process similar to S240 in the first embodiment is performed. Then, the managing operation receiving process terminates.

Meanwhile, the CPU 11 of the MFP 10 performs the MFP process as follows (see FIG. 12). When the MFP process starts, the CPU 11 judges as to whether an event indicating the USB memory 50 is connected to the USB connector 23 occurs (S910). If a determination is made that an event has occurred (S910: YES), the process moves to S920, wherein it is judged as to whether there is any certificate file in the USB memory 50 connected to the USB connector 41 similarly to S420 in the second embodiment (see FIG. 6).

If a determination is made that there is no certificate file in the USB memory 50 (S920: NO), the CPU 11 terminates the MFP process without executing any steps from S930 to S970.

In S920, if a determination is made that there is a certificate file in the USB memory 50 (S920: YES), the process moves to S930, wherein the CPU 11 reads the certificate file from the USB memory 50. Then, the process moves to S940, wherein the CPU 11 sets the communication configuration of the MFP 10 itself according to the configuration instruction data in the read certificate file. For example, the IP address indicated in the configuration instruction data is stored in the flash memory 13 to be the IP address of the MFP 10 itself (S940).

Then, the process moves to S950, wherein the CPU 11 writes the server certificate and the private key stored in the certificate file in the USB memory 50 into the flash memory 13 to install them into the MFP 10 itself. When the installation is completed, the process moves to S960, wherein a message is displayed in the display area of the display operation unit 21, indicating that installation is complete. Then, the process moves to S970.

In 970, the CPU 11 deletes the read certificate file, which was used for the communication configuration of the MFP 10, from the USB memory 50 so that the IP address is prevented from being read and registered in the other MFPs 10. Then, the MFP process terminates.

In S910, if a determination is made that there is no connection event (S910: NO), the process moves to S980, wherein the CPU 11 of the MFP 10 performs a process corresponding to the event which has occurred. Then the MFP process terminates. It should be noted that if there is no event or no process to be performed in S980, the MFP process terminates without executing any step, and the process returns to S910.

The above described the communication system 4 in accordance with the fourth embodiment. In the communication system 4, when a server certificate and a private key are issued, the configuration instruction data instructing the MFP 10 to set the IP address, i.e., the owner ID information, included in the server certificate as the IP address of the MFP 10 itself is created. Accordingly, the MFP 10 sets the IP address corresponding to the server certificate and the private key. Thus, in the present embodiment, an incorrect server certificate can be securely prevented from being installed into a wrong MFP 10. In addition, the communication of the MFP 10 can be configured simultaneously to the installation of a correct server certificate and a correct private key. Thus, the communication configuration of the MFP 10 and the installation of the server certificate can be easily achieved during system construction.

Fifth Embodiment

Figure 13:
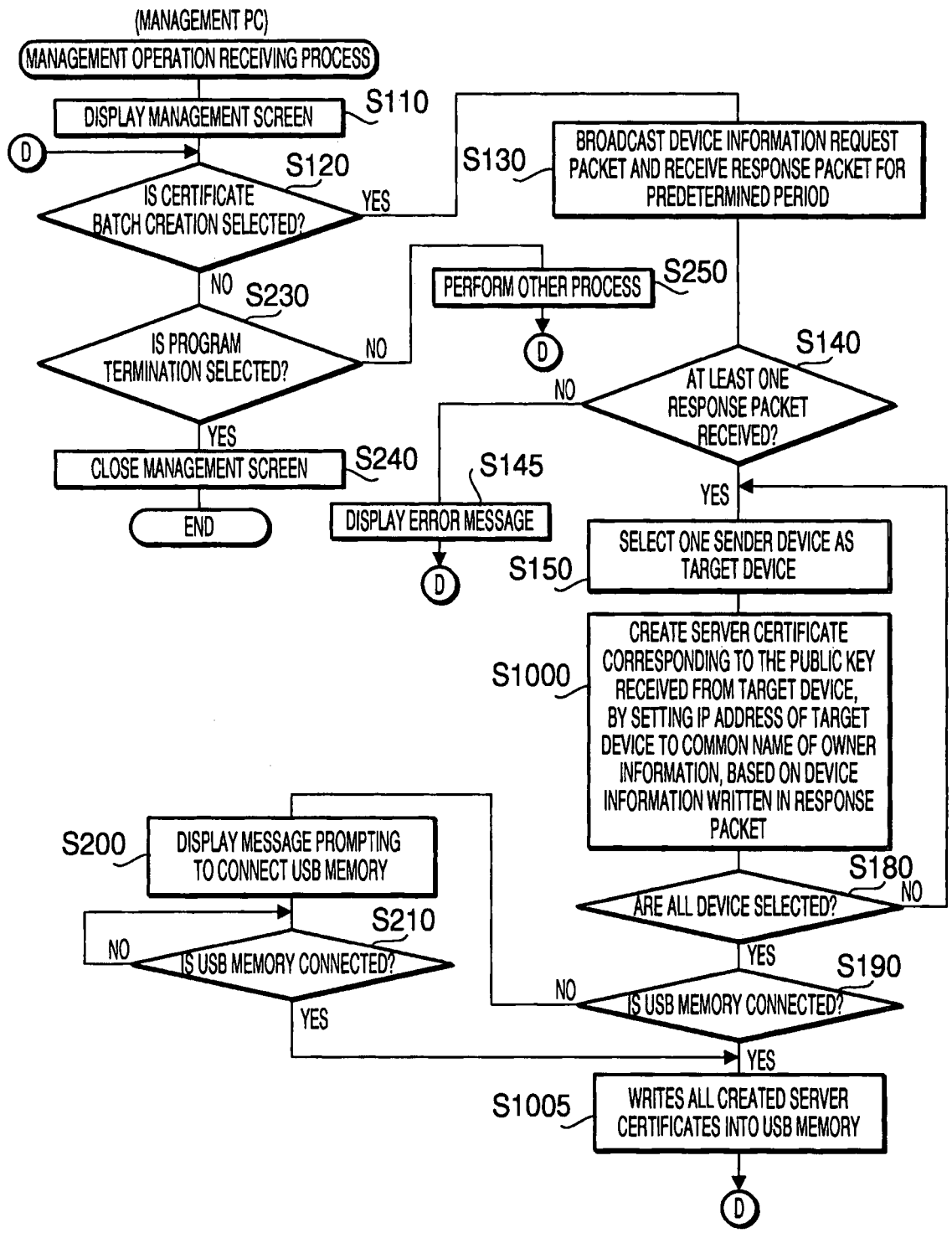
FIG. 13 is a flowchart illustrating the managing operation receiving process to be performed by the CPU 31 of the management PC 30a in accordance with a fifth embodiment of the present invention.
Figure 14:
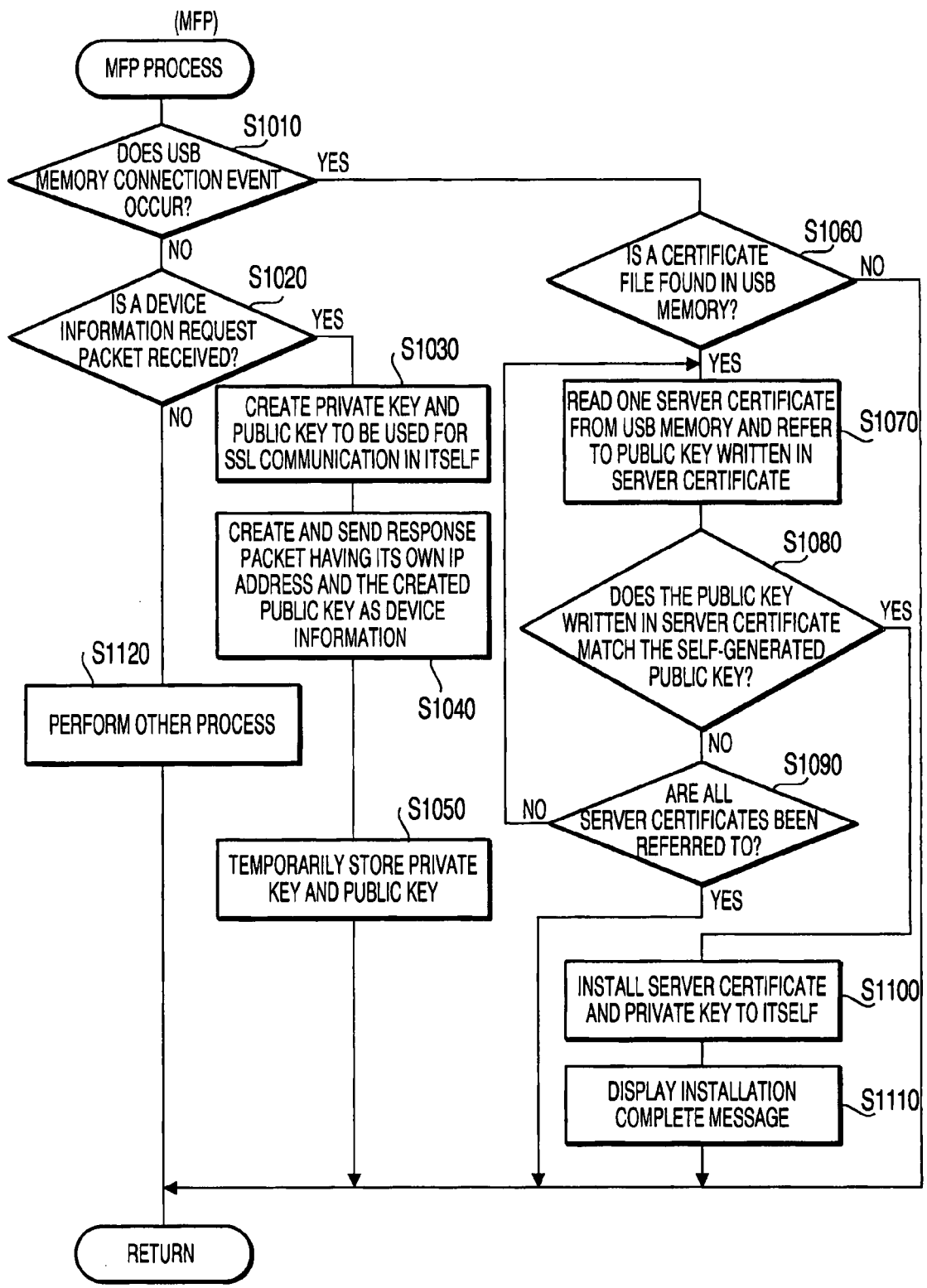
FIG. 14 is a flowchart illustrating the MFP process to be repeatedly performed by the CPU 11 of the MFP 10 in accordance with the fifth embodiment of the present invention.

Hereinafter, with reference to FIGS. 13 and 14, a fifth embodiment of the present invention will be described. FIG. 13 is a flowchart illustrating a managing operation receiving process to be performed by the CPU 31 of the management PC 30*a* in accordance with the fifth embodiment of the present invention. FIG. 14 is a flowchart illustrating an MFP process to be repeatedly performed by the CPU 11 of the MFP 10 in accordance with the fifth embodiment of the present invention.

A communication system 5 in accordance with the fifth embodiment is generally similar to the communication system 1 in accordance with the first embodiment, but differs in that the MFP 10 itself has a function to generate a public key and a private key for the SSL communication and in content of the managing operation receiving process which is to be performed by the CPU 31 of the management PC 30*a*, and in the MFP process to be performed by the CPU 11 of the MFP 10. Accordingly, the following description will focus only on the configuration different from the communication system 2 in accordance with the previous embodiments.

In the present embodiment, the MFP 10 is configured to transmit a response packet containing a public key requiring a digital signature and its own IP address as the device information in response to a device information request packet as the MFP 10 receives a device information request packet. The managing operation receiving process shown in FIG. 13 performed by the management PC 30*a* is based on the configuration of the MFP 10 as above.

When the managing operation receiving process starts, the CPU 11 of the MFP 10 performs generally similarly to the process in the first embodiment, however, S160 and S170 (see FIG. 4) are replaced with S1000, and S220 is replaced with S1005. Specifically, when at least one response packet is received (S140: YES), the CPU 31 of the management PC 30*a* selects an MFP 10 from the MFPs 10 which transmitted the response packets, as a target device to which a server certificate issued will belong (S150). Then, the process moves to S1000.

In S1000, based on the device information included in the response packet transmitted from the MFP 10 selected as above in S150, the CPU 31 generates a server certificate corresponding to the public key included in the response packet. In this regard, the IP address of the MFP 10 as the target device represents a common name of the subject information included in the server certificate. It should be noted that the server certificate is issued to belong to the sender MFP 10 of the response packet and includes the public key information regarding the public key indicated in the response packet. Next, the process moves to S180.

In S190 or in S210, if it is determined that the USB memory 50 is connected to the management PC 30*a*, the process moves to S1005, wherein all the server certificates created in S1000 are collectively written into the USB memory 50. Then, the process returns to S120.

Next, the MFP process to be repeatedly performed by a CPU 11 of an MFP 10 will be described with reference to FIG. 14. When the MFP process starts, the CPU 11 judges as to whether an event indicating that the USB memory 50 is connected to the USB connector 23 occurs. If a determination is made that an event has occurred (S1010: YES), the process moves to S1060. If a determination is made that no event occurred (S1010: NO), the process moves to S1020.

In S1020, the CPU 11 judges as to whether a device information request packet is received through the communication interface 15. If the CPU 11 determines that a device information request packet has been received (S1020: YES), the process moves to S1030, wherein the CPU 11 creates a private key and a public key to be used for the SSL communication. Then, the process moves to S1040, wherein a response packet having its own IP address as device information is created, and the response packet is returned to the management PC 30*a* as the sender of the device information request packet through the communication interface 15. Then, the process moves to S1050, wherein the private key and the public key created as above are temporarily stored in the flash memory 13 of the MFP 10. Then the MFP process terminates.

In S1060, the CPU 11 judges as to there is a server certificate in the USB memory 50 connected to the USB connector. If a determination is made that there is no server certificate in the USB memory 50 (S1060: NO), the MFP process terminates. If a determination is made that there is a server certificate in the USB memory 50 (S1060: YES), the process moves to S1070.

In S1070, the CPU 11 reads the server certificate from the USB memory 50 and refers to the public key information indicated in the server certificate. Then, the process moves to S1080, wherein it is judged as to whether the public key written in the server certificate matches the public key which was generated and stored temporarily in the flash memory 13 in the MFP 10 itself. If a determination is made that the public key written in the server certificate does not match the public key which was generated in the MFP 10 itself (S1080: NO), the process moves to S1090, wherein it is judged as to whether the public keys in all the server certificates stored in the USB memory 50 have been referred to.

In S1090, if a determination is made that the not all the public keys in the server certificates have been referred (S1090: NO), the process returns to S1070, wherein a server certificate is read from the USB memory 50, and the process moves to the succeeding steps. If a determination is made that the public keys of all the server certificates have been referred to (S1090: YES), the MFP process terminates.

If a determination is made that the public key written in the server certificate matches the public key which was generated and stored temporarily in the flash memory 13 in the MFP 10 itself (S1080: YES), the process moves to S1100, wherein the server certificate read as above and the private key stored temporarily in the flash memory 13 are installed into the MFP 10 itself. Then, the process moves to S1110, wherein a message is displayed in the display area of the display operation unit 21, indicating that installation is complete. Then, the MFP process terminates.

If a determination is made that there is no USB memory 50 connection event (S1010: NO) and there is no device information request packet received (S 1020: NO), the process moves to S1120, wherein the CPU 1 1 of the MFP 10 performs the other process. It should be noted that if there is no event or no process to be performed in S1120, the MFP process terminates without executing any process, and the process returns to S1010.

The above described the communication system 5 in accordance with the fifth embodiment of the present invention. The management PC 30*a* configuring the communication system 5 acquires a public key from each of the plurality of MFPs 10, and installs a plurality of server certificates, each corresponding to the public key, collectively into the USB memory 50. It should be noted that each MFP 10 has an automatically selecting function to detect a server certificate issued to itself from the USB memory 50 and selectively install the server certificate to itself.

Thus, the user of the communication system 5 can install a correct server certificate simply by inserting and removing the USB memory 50 into and from each MFP 10. This simple operation allows each MFP 10 to be ready for SSL communication.

Although examples of carrying out the invention have been described, those skilled in the art will appreciate that there are numerous variations and permutations of the electric certification generating system that falls within the spirit and scope of the invention as set forth in the appended claims. It is to be understood that the subject matter defined in the appended claims is not necessarily limited to the specific features or act described above. Rather, the specific features and acts described above are disclosed as example forms of implementing the claims. For example, a function to encrypt a certificate file may be implemented into the management PC 30*a* in the second and the fourth embodiments of present invention.

What is claimed is:

1. An electronic certificate issuance system comprising:
a plurality of communication devices; and
    an electronic certificate issuing device for issuing an electronic certificate and a private key corresponding to the electronic certificate as a certification set for each of the plurality of communication devices,
    wherein the electronic certificate issuing device includes:
    a first connecting interface, through which an external storage device can be removably connected to the electronic certificate issuing device;
        an obtaining system configured to obtain a node ID assigned to each of the plurality of communication devices by requesting each of the plurality of communication devices for the node ID;
    a generating system configured to generate a certification set for each of the plurality of communication devices whom a node ID was obtained, the electronic certificate in each certification set including the node ID obtained by the obtaining system as owner ID information of the electronic certificate and the private key corresponding to the electronic certificate for each of the plurality of communication devices; and
    a writing system configured to collectively write a plurality of certification sets, one certification set for each of the plurality of communication devices whom a node ID was obtained generated by the generating system into the external storage device connected to the first connecting interface in a batch, and
    wherein each of the plurality of communication devices includes:
    a second connecting interface, through which the external storage device can be removably connected to the communication device;
    a judging system configured to, when the external storage device is connected to the communication device through the second connecting interface, judge as to whether one of the collectively written plurality of certification sets stored in said external storage device is for the communication device, said judging being based upon a comparison of the owner ID information included in said electronic certificate in each of the collectively written plurality of certification sets and the node ID assigned to the communication device; and
    an installing system configured to install the electronic certificate and the private key corresponding to the electronic certificate into the communication device itself based upon the judging.

2. The electronic certificate issuance system according to claim 1,
    wherein the plurality of communication devices and the electronic certificate issuing device are communicably connected to each other through a network; and
    wherein the obtaining system obtains the node ID assigned to each of the plurality of communication devices by broadcasting a request for the node ID to the each of the plurality of communication devices.

3. The electronic certificate issuance system according to claim 1, wherein the electronic certificate issuing device includes a labeling system configured to assign an electronic label identifying the node ID included in the electronic certificate as the owner ID information of the electronic certificate for each of the collectively written plurality of certification sets generated by the generating system; and
    wherein the judging system further uses said electronic label assigned by the labeling system to judge whether one of the collectively written plurality of certification sets stored in said external storage device is for the communication device.

4. The electronic certificate issuance system according to claim 1,
    wherein the electronic certificate issuing device includes a file creating system to create a plurality of data files, each of which contains a set of data representing the electronic certificate with the node ID as the owner ID information of the electronic certificate and the private key corresponding to the electronic certificate; and
    wherein the writing system is configured to collectively write the plurality of data files in a batch into the external storage device connected to electronic certificate issuing device through the first connecting interface.

5. The electronic certificate issuance system according to claim 4, wherein the file creating system is configured to encrypt each of the plurality of data files.

6. The electronic certificate issuance system according to claim 4,
    wherein each of the plurality of communication devices is configured to generate an encryption key to encrypt the data file created by the file creating system;
    wherein each of the plurality of communication devices is provided with an ID information transmitting system, which transmits the node ID assigned to the communication device and the generated encryption key to the electronic certificate issuing device through a network;

wherein the electronic certificate issuing device is communicably connected with the plurality of communication devices through the network;

wherein the obtaining system of the electronic certificate issuing device obtains the node ID assigned to each of the plurality of communication devices and the encryption key through the network from each of the plurality of communication devices for which the electronic certificate is issued; and wherein the file creating system encrypts each of the plurality of data files by using a corresponding encryption key obtained by the obtaining system from the communication device having the node ID which is identical to the owner ID information of the electronic certificate to be contained in the encrypted data file.

7. The electronic certificate issuance system according to claim 1, wherein the electronic certificate issuing device includes a file creating system to create a plurality of data files, each of which has a file name and contains a set of data representing the electronic certificate and the private key corresponding to the electronic certificate issued by the electronic certificate issuing device;

wherein the file name of the data file is represented by the node ID as the owner ID information of the electronic certificate;

wherein the writing system is configured to collectively write the plurality of data files in a batch into the external storage device connected to the electronic certificate issuing device through the first connecting interface;

wherein the judging system of each of the communication devices determines whether one of the plurality of data files stored in the external storage device is for the communication device based upon a comparison of the file name associated with each of the plurality of data files and the node ID assigned to the communication device; and wherein the installing system of each of the communication devices installs the electronic certificate and the private key corresponding to the electronic certificate in the set of data contained in the data file into the communication device when the judging system determines that a data file that includes the electronic certificate and the private key corresponding to the electronic certificate is for the communication device.

8. An electronic certificate issuance system comprising:
a plurality of communication devices; and
an electronic certificate issuing device for issuing an electronic certificate and a private key corresponding to the electronic certificate as a certification set for each of the plurality of communication device said electronic certificate including an owner ID information,
wherein the electronic certificate issuing device includes:
a first connecting interface, through which an external storage device can be removably connected to the electronic certificate issuing device;
an obtaining system configured to obtain node ID information indicating a routable network address to be assigned to the plurality of communication devices;
a generating system configured to generate the certification set including the electronic certificate and the private key corresponding to the electronic certificate and further including configuration data, which contains an instruction for each of the plurality of communication devices to set a routable network address of the communication device to the owner ID information contained in the electronic certificate in the certification set; and
a writing system configured to collectively write a plurality of certification sets, one certification set for each of the plurality of communication devices including the configuration data, the electronic certificate, and the private key corresponding to the electronic certificate generated by the generating system for each of the plurality of communication devices, into the external storage device connected to the first connecting interface in a batch, and wherein the at least one communication device includes:
a second connecting interface, through which the external storage device can be removably connected to the communication device;
a judging system configured to, when the external storage device is connected to each of the plurality of communication devices through the second connecting interface, judge as to whether there is at least one certificate set stored in said external storage; and
a configuration installing system configured to arbitrarily select one certificate set among said at least one certificate sets, sets the routable network address of the communication device to the owner ID information contained in the electronic certificate in the certification set, and install the electronic certificate and the private key corresponding to the electronic certificate included in the selected certificate set into the communication device.

9. An electronic certificate issuance system comprising:
a plurality of communication device, which are communicably connected to a network; and
an electronic certificate issuing device, which is communicably connected with the plurality of communication devices through the network, for issuing an electronic certificate for the plurality of communication devices,
wherein the electronic certificate issuing device includes:
a first connecting interface, through which an external storage device can be removably connected to the electronic certificate issuing device;
an obtaining system configured to obtain a node ID assigned to each of the plurality of communication devices and a public key corresponding to a private key generated in each of the plurality of communication devices by requesting each of the plurality of the communication devices for the node ID through the network;
a generating system configured to generate an electronic certificate for each of the plurality of communication devices whom a node ID was obtained, the electronic certificate including the node ID obtained from the communication device by the obtaining system as owner ID information of the electronic certificate, the public key from the communication device and certify authenticity of the public key obtained from each of the plurality of communication devices by the obtaining system;
a writing system configured to collectively write a plurality of the electronic certificates generated for each of the plurality of communication devices by the generating system into the external storage device connected to the first connecting interface in a batch,
wherein each of the plurality of communication devices includes:
a second connecting interface, through which the external storage device can be removably connected to the communication device;
a key generating system, which generates the private key to be used in the communication device and the public key corresponding to the private key;
an ID information transmitting system, which transmits the public key generated by the key generating system and the node ID assigned to the communication device to the electronic certificate issuing device through the network;

a judging system configured to judge as to whether an electronic certificate issued for the communication device is written in the external storage device when the external storage device is connected to the communication device through the second connecting interface; and an installing system, which installs the electronic certificate into the communication device when the judging system determines the electronic certificate issued for the communication device is written in the external storage device.

10. The electronic certificate issuance system according to claim 9, wherein the obtaining system obtains the node ID assigned to each of the plurality of communication devices by broadcasting a request for the node ID to the each of the plurality of communication devices.

11. The electronic certificate issuance system according to claim 9, wherein the judging system determines whether one of the electronic certificates stored in the external storage device is for the communication device by referring to the public key generated by the key generating system.

12. The electronic certificate issuance system according to claim 9, wherein said public and private key are temporally stored and said judging system judges whether an electronic certificate issued for the communication device is written in the external storage device when the external storage device is connected to the communication device through the second connecting interface by comparing the public key from the electronic certificate with the temporally stored public key.

13. A communication device with a node ID assigned thereto, comprising:

a key generating system, which generates a private key to be used in the communication device and a public key corresponding to the private key;

an ID information transmitting system, which transmits the public key generated by the key generating system and the node ID assigned to the communication device to an electronic certificate issuing device through the network;

a connecting interface through which an external storage device containing a plurality of encrypted data sets, each of said plurality of encrypted data sets includes data representing an electronic certificate and a private key corresponding to the electronic certificate can be removably connected to the communication device, said encrypting using said public key generated by the key generating system;

a judging system configured to, when the external storage device is connected to the connecting interface, judge as to whether one of the plurality of encrypted data sets stored in said external storage device is for the communication device, said judging being based upon a comparison of a owner ID information contained in an electronic certificate in each of the at least one encrypted data set and the node ID assigned to the communication device; and an installing system configured to install a decrypted electronic certificate based on the judgement of the judging system.

14. The communication device according to claim 13, wherein each of the plurality of data sets contained in the external storage device consist of a data file having a file name, the file name being the owner ID information of the electronic certificate;

wherein when the external device is connected to the communication device through the connecting interface the judging system judges whether one of the plurality of data sets is for the communication device by comparing the file name for the data file corresponding to each of the plurality of data sets with the node ID assigned to the communication device as a data file which has a file name being identical to the node ID assigned to the communication device is written in the external storage device; and wherein the installing system installs corresponding one of the plurality of data sets written in the external storage device into the communication device when the judging system determines the data file having a file name which is identical to the node ID assigned to the communication device is written in the external storage device.

15. A communication device comprising:

a connecting interface through which an external storage device can be removably connected;

a judging system for judging as to whether a plurality of data sets including configuration data, each of said plurality of data sets contains a routable network address for the communication device and an instruction for the communication device to set the contained routable network address to the communication device, an electronic certificate, which includes a routable network address as owner ID information of the electronic certificate being identical to the routable network address indicated in the configuration data, and a private key corresponding to the electronic certificate, is written in the external storage device; and a configuration installing system configured to arbitrarily select one data set among the plurality of data sets written in the external storage device, sets the routable network address of the communication device to the routable network address node ID contained in the configuration data which is included in the selected certificate set, and install the electronic certificate and the private key corresponding to the electronic certificate included in the selected certificate set into the communication device.

16. A computer readable storage device comprising computer readable instructions for controlling a computer, having a connecting interface through which an external storage device is connected to the computer, to have an electronic certificate and a private key corresponding to the electronic certificate issued for the computer, by executing steps of:

generating a private key to be used in a communication device and a public key corresponding to the private key;

transmitting the public key and a node ID assigned to the communication device to an electronic certificate issuing device through the network;

judging when the external storage device is connected to the computer through the connecting interface whether one of a plurality of encrypted data sets stored in said external storage device is for the computer, each of the plurality of encrypted data sets including an encrypted electronic certificate including a node ID as owner ID information of the encrypted electronic certificate being identical to a node ID assigned to the communication device and the private key corresponding to the encrypted electronic certificate, said judging being based upon a comparison of a owner ID information contained in an electronic certificate in each of the plurality of encrypted data sets and the node ID assigned to the communication device; and installing a decrypted electronic certificate and the private key corresponding to the encrypted electronic certificate written in the external storage device into the communication device based on the judging.

17. A computer readable storage device comprising computer readable instructions for controlling a computer, having a connecting interface through which an external storage device is connected to the computer, to execute a method of:

judging whether a plurality of data sets, each of said plurality of data sets includes configuration data, which contains a routable network address for a communication device and an instruction for the communication device to set the contained routable network address to the communication device, an electronic certificate, which includes a routable network address as owner ID information of the electronic certificate being identical to the routable network address indicated in the configuration data, and a private key corresponding to the electronic certificate, is written in the external storage device;

selecting arbitrarily one data set among said plurality of data sets written in the external storage device;

setting the routable network address of the communication device to the routable network address contained in the configuration data which is included in the selected certificate set; and installing the electronic certificate and the private key corresponding to the electronic certificate included in the selected certificate set into the communication device.

18. A communication device comprising:

a connecting interface, through which an external storage device can be removably connected to the communication device;

a judging system configured to, when the external storage device is connected to the communication device through the connecting interface, judge as to whether one of a plurality of certification sets stored in said external storage device is for the communication device, each certification set includes an electronic certificate with a node ID as owner ID information of the electronic certificate and a private key corresponding to the electronic certificate, said judging being based upon a comparison of the owner ID information included in said electronic certificate in each of the plurality of certification sets and the node ID assigned to the communication device; and an installing system configured to install the electronic certificate and the private key corresponding to the electronic certificate into the communication device based upon the judging.

19. A computer readable storage device comprising computer readable instructions for controlling a computer in a communication device, the communication device having a connecting interface through which an external storage device is connected, to execute the method of:

judging, when the external storage device is connected to the communication device through the connecting interface, whether one of a plurality of certification sets stored in said external storage device is for the communication device, each of said plurality of data sets includes an electronic certificate with a node ID as owner ID information of the electronic certificate and a private key corresponding to the electronic certificate, said judging being based upon a comparison of the owner ID information included in said electronic certificate in each of the plurality of certification sets and the node ID assigned to the communication device; and installing the electronic certificate and the private key corresponding to the electronic certificate into the communication device based upon the judging.

* * * * *